United States Patent
Kubo et al.

(10) Patent No.: US 8,218,171 B2
(45) Date of Patent: Jul. 10, 2012

(54) PRINT ORDER ACCEPTING APPARATUS AND PRINTING SYSTEM

(75) Inventors: Motohiko Kubo, Wakayama (JP); Kazuhiro Kobayashi, Wakayama (JP)

(73) Assignee: NK Works Co., Ltd., Wakayama-shi (JP)

( * ) Notice: Subject to any disclaimer, the term of this patent is extended or adjusted under 35 U.S.C. 154(b) by 1513 days.

(21) Appl. No.: 11/384,550

(22) Filed: Mar. 21, 2006

(65) Prior Publication Data
US 2006/0224463 A1    Oct. 5, 2006

(30) Foreign Application Priority Data

Mar. 30, 2005  (JP) .................................. 2005-097166
Mar. 31, 2005  (JP) .................................. 2005-101004

(51) Int. Cl.
*G06F 3/12*      (2006.01)
*G06K 15/00*   (2006.01)

(52) U.S. Cl. .......................... 358/1.15; 358/1.9; 358/1.13
(58) Field of Classification Search .................. 358/1.1, 358/1.4, 1.5, 1.11, 1.12, 1.13, 1.14, 1.15, 358/1.16, 1.17, 1.18, 1.9
See application file for complete search history.

(56) References Cited

U.S. PATENT DOCUMENTS

| 6,788,425 B1 * | 9/2004 | Ohtsuka et al. ............. 358/1.13 |
| 2002/0040303 A1 * | 4/2002 | Hamamura et al. ............. 705/1 |
| 2004/0001189 A1 * | 1/2004 | Oka et al. ........................ 355/40 |

FOREIGN PATENT DOCUMENTS

| JP | 2001148067 A * | 5/2001 |
| JP | 2003-121946 A | 4/2003 |

OTHER PUBLICATIONS

Notification of Reasons for Rejection directed to Japanese Patent Application No. 2005-097166, mailed on Oct. 5, 2010; 2 pages.

* cited by examiner

*Primary Examiner* — Thierry Pham
(74) *Attorney, Agent, or Firm* — Smith Patent Office

(57) ABSTRACT

A photo printing system includes a display to display thereon an order screen containing at least one of images corresponding to image data files read out from a recording medium by a reading unit; and an inputting unit to be used for inputting order information containing the number of prints for the image being displayed on the display. A photo print for at least one of one or more images displayed on the display, to each of which order information to request one or more prints has been given, is made before an order for the one or more images to each of which order information to request one or more prints has been given is determined.

18 Claims, 27 Drawing Sheets

FIG. 17

```
RECEIPT

Your name
○○○○

Acceptance ID:R0000023
Terminal ID:CT-2
Acceptance data:8/18/2004 13:56

Order number     00000012
Branch number    01,02,03
Input medium     SD/MMC
Size     3.5×5 inch ¥30×40                    ¥1200
Basic Charge              ¥ 300
Tax                       ¥  75
_____
Total amount              ¥1575

Thank you for ordering
Please bring this receipt to
 service counter

△△△Camera
```

Image to be printed is added;the number of prints is increased; correction value is increased/decreased
(in processing/after processing)

Image to be printed is eliminated;the number of prints is decreased; correction value is increased/decreased
(in processing)

FIG. 24

Contents of your order have been changed.
Printing is stopped.

PRINT ORDER ACCEPTING APPARATUS AND PRINTING SYSTEM

BACKGROUND OF THE INVENTION

1. Field of the Invention

The present invention relates to a print order accepting apparatus that accepts an order for photo prints, and also to a printing system that accepts an order for photo prints and makes the photo prints.

2. Description of Related Art

Recently known is a print order accepting apparatus placed in the storefront of a development printing (DP) store for accepting an order for prints according to an image data file or the like obtained by photographing with a digital camera, as disclosed in JP-A-2003-121946. Such a print order accepting apparatus includes a touch panel type display. When a customer sets in the print order accepting apparatus a medium brought by him- or herself and recording thereon image data files, a thumbnail image according to each image data file recorded on the medium is displayed on a display screen. In this case, when many frames of image data files are recorded on the medium, a plurality of pages of thumbnail images, for example, each constituted by eight frames, are displayed. The customer who has checked the thumbnail images displayed on the display screen, can input, through the touch panel, information on his or her order, for example, the number of prints for each image.

Further, a photo processing apparatus is placed in the DP store. The photo processing apparatus is connected to the print order accepting apparatus through a data transmission network so that the photo processing apparatus can obtain the image data files and order information received by the print order receiving apparatus. On the basis of the image data files and the order information obtained from the print order accepting apparatus, the photo processing apparatus prints images on respective printing papers to make photo prints.

In the printing system constituted by the print order accepting apparatus and the photo processing apparatus as described above, the photo processing apparatus obtains image data files and order information concerning the image data files after the customer completes the input of the order information on all the image data files recorded on the medium, and determines the order. That is, after the order for printing for all image data files is determined, the photo processing apparatus starts processing of printing. Generally in such a photo processing apparatus, about ten minutes are required from the start of print processing to the finish of the first photo print. Thus, the customer who has completed his or her order for printing is kept waiting for about ten minutes till the first photo print is finished, and further for several tens of minutes till all photo prints are finished.

SUMMARY OF THE INVENTION

An object of the present invention is to provide a print order accepting apparatus and a printing system, capable of reducing a feeling of waiting a long time, of a customer who is waiting for the finish of photo prints.

According to an aspect of the present invention, a printing system that accepts an order for photo prints and makes the photo prints, comprises a reading unit that reads out a plurality of image data files recorded on a recording medium; a display that displays thereon an order screen containing at least one of a plurality of images corresponding to the plurality of image data files read out by the reading unit; an inputting unit to be used for inputting order information containing the number of prints for an image being displayed on the display; and a print making control unit that makes control such that a photo print for at least one of one or more images displayed on the display, to each of which order information to request one or more prints has been given, is made before an order is determined for the one or more images to each of which order information to request one or more prints has been given.

According to another aspect of the present invention, a printing system comprises a print order accepting apparatus that accepts an order for photo prints from a customer, and a photo processing apparatus that makes the photo prints on the basis of the order accepted by the print order accepting apparatus. The print order accepting apparatus comprises a reading unit that reads out a plurality of image data files recorded on a recording medium; a display that displays thereon an order screen containing at least one of a plurality of images corresponding to the plurality of image data files read out by the reading unit; an inputting unit to be used for inputting order information containing the number of prints for an image being displayed on the display; a display control unit that changes the order screen being displayed on the display, into another order screen containing at least one of the plurality of images corresponding to the plurality of image data files, that has not yet been displayed in any displayed order screen; and a transmitting unit that transmits to the photo processing apparatus an image data file corresponding to at least one of the images contained in the order screen before changed by the display control unit, and order information on the image.

According to still another aspect of the present invention, a print order accepting apparatus comprises a reading unit that reads out a plurality of image data files recorded on a recording medium; a display that displays thereon an order screen containing at least one of a plurality of images corresponding to the plurality of image data files read out by the reading unit; an inputting unit to be used for inputting order information containing the number of prints for an image being displayed on the display; and a print making control unit that makes control such that a photo print for at least one of one or more images displayed on the display, to each of which order information to request one or more prints has been given, is made before an order is determined for the one or more images to each of which order information to request one or more prints has been given.

According to the invention, the first photo print is finished sooner than that in a case wherein making photo prints is started after an order for images to each of which order information to request one or more prints has been given, is determined. Therefore, the customer can obtain the first photo print earlier. The customer can appreciate the finished photo print while waiting for the remaining photo prints to be finished. This can reduce a feeling of waiting a long time, of the customer who is waiting for the finish of the photo prints.

In the present invention, "an order is determined" means not simply that the customer performs an operation for changing an order screen. It means that the customer performs the final operation for ordering photo prints.

According to still another aspect of the present invention, the print making control unit may make control such that photo prints are made each time when the total number of images for each of which order information to request one or more prints has been input with the inputting unit, reaches a first predetermined number. According to this aspect, making photo prints can be started more rapidly in comparison with a case wherein making the photo prints is started, for example, after order information is given to the images corresponding to all the image data files read out by the reading unit, and before an order for the images is determined.

According to still another aspect of the present invention, the print making control unit may make control such that photo prints are made each time when a new order screen is displayed first after the total number of images for each of which order information to request one or more prints has been input with the inputting unit, reaches the first predetermined number. If the photo prints are made immediately after the total number of images for each of which order information to request one or more prints has been input with the inputting unit, reaches the first predetermined number, it is inconvenient for the operator because the order information on photo prints for images contained in an order screen being displayed on the display may be changed after making the photo prints was started. Contrastingly, according to this aspect of the present invention, the photo prints for the first predetermined number of images can be made after the total number of images for each of which order information to request one or more prints has been input, reaches the first predetermined number and an operation is performed for displaying a new order screen on the display, that is, after the operator of the printing system agrees that the photo prints for images displayed in an order screen at the time when the operation for changing the order screen is performed, are made in accordance with the order information that he or she has input with the inputting unit.

According to still another aspect of the present invention, the print making control unit may make control such that photo prints are made each time when the total number of images displayed on the display reaches a positive integer multiple of a second predetermined number.

According to the above aspect of the present invention, making photo prints can be started more rapidly in comparison with a case wherein making the photo prints is started, for example, after order information is given to the images corresponding to all the image data files read out by the reading unit, and before an order for the images is determined.

If the print making control unit makes control such that photo prints are made for each predetermined number of images for each of which order information to request one or more prints has been input with the inputting unit, for example, in the case that images to each of which order information to request one or more prints is to be given, are sparse in anterior images displayed on the display and concentrates in posterior images displayed on the display, making photo prints can not rapidly be started because it requires a long time until the number of images for each of which order information to request one or more prints has been input with the inputting unit, reaches the predetermined number. According to the above aspect of the present invention, however, even in the case, the photo prints for the anterior images can be made rapidly.

According to still another aspect of the present invention, the second predetermined number may be the maximum number of images that can be displayed in one order screen.

According to still another aspect of the present invention, the print making control unit may make control such that photo prints are made each time when an operation for changing the order screen being displayed on the display is performed n times, where n is a positive integer.

According to the above aspects of the present invention, photo prints can be made after an operation is performed for displaying a new order screen on the display, that is, after the operator of the printing system agrees that the photo prints for images displayed in an order screen at the time when the operation for changing the order screen is performed, are made in accordance with the order information that he or she has input with the inputting unit.

According to still another aspect of the present invention, the system preferably further comprises a number assigning unit that assigns a docket number to each image data file corresponding to an image to which order information to request one or more prints has been given with the inputting unit.

For example, in the case of a printing system capable of accepting orders for photo prints from a plurality of customers at once, or in the case of a printing system capable of performing print processing for images obtained from a film, in parallel with print processing for an order accepted from a customer, print processing may not continuously be performed for a plurality of image data files ordered in a lump by a customer, that is, image data files corresponding to images displayed in one or more order screens, and print processing for another order may be performed in the course of print processing for image data files for which photo prints to be made in order under the control of the print making control unit. According to the above aspect of the present invention, however, even in the case, a plurality of image data files ordered in a lump by a customer can be known from docket numbers. Thus, the management of image data files in the printing system becomes easy.

According to still another aspect of the present invention, each docket number may contain a number common to image data files in groups corresponding to photo prints to be made in a lump, and a number common to the image data files in a group corresponding to photo prints to be made in a lump. According to this aspect, it becomes easy to identify image data files corresponding to photo prints to be made in a lump.

According to still another aspect of the present invention, each docket number may constitute at least part of a folder name of a data folder to store therein image data files corresponding to photo prints to be made in a lump. According to this aspect, a directory construction makes it possible to identify image data files corresponding to photo prints to be made in a lump, and image data files ordered in a lump by a customer.

According to still another aspect of the present invention, the system preferably further comprises a printing unit that prints a docket number on a back side of each photo print. According to this aspect, for which customer each photo print is can be known from the docket number printed on the back side of the photo print. Thus, the management of photo prints becomes easy.

According to still another aspect of the present invention, the system preferably further comprises a receipt printer that issues a receipt on which a docket number has been printed. According to this aspect, a customer can easily grasp the status of his or her order for photo prints.

According to still another aspect of the present invention, the system preferably further comprises an image data storage section that stores image data files corresponding to one or more images to each of which order information has been given, in one of one or more data folders; an order information storage section that stores therein order information; a storage control section that controls the image data storage section to store therein the image data file corresponding to at least one of the one or more images to each of which order information has been given, and controls the order information storage section to store therein order information corresponding to the one or more image data files stored in the image data storage section, before an order is determined for the one or more images to each of which order information has been given; a status information storage section that stores therein status information as to whether or not print processing has been started for image data files corresponding to images to each of which order information to request one or more prints has been given, of the image data files stored in each data folder provided in the image data storage section; and a judging section that judges, on the basis of status information being stored in the status information storage section, whether or not at least one of order information being stored in the order information storage section, and storage contents of the data folder, can be changed.

According to still another aspect of the present invention, a printing system comprises a print order accepting apparatus that accepts an order for photo prints from a customer, and a photo processing apparatus that makes the photo prints on the basis of the order accepted by the print order accepting apparatus. The print order accepting apparatus comprises a reading unit that reads out a plurality of image data files recorded on a recording medium; a display that displays thereon an order screen containing at least one of a plurality of images corresponding to the plurality of image data files read out by the reading unit; an inputting unit to be used for inputting order information containing the number of prints for an image being displayed on the display; and a print information transmitting unit that transmits to the photo processing apparatus an image data file corresponding to at least one of one or more images to each of which order information has been given, and the order information on the image. The photo processing apparatus comprises an image data storage section that stores therein image data files transmitted by the print information transmitting unit, such that a group of image data files transmitted in a lump is stored in one data folder; an order information storage section that stores therein order information transmitted by the print information transmitting unit; a printing section that prints on a printing paper an image to which order information to request one or more prints has been given, of the image data files being stored in the image data storage section, on the basis of order information being stored in the order information storage section; a status information storage section that stores therein status information on each data folder provided in the image data storage section, as to whether or not the printing section has started print processing for the image data files contained in the data folder; a judging section that judges on the basis of status information being stored in the status information storage section, whether or not at least one of order information being stored in the order information storage section, and storage contents of the data folder, can be changed; and a status information changing section that changes status information being stored in the status information storage section, when the printing section starts print processing for the image data files contained in the data folder.

In the present invention, an expression "images to each of which order information has been given" without further noted may mean images only constituted by images to each of which order information to request one or more prints has been given; or images including images to each of which order information to request no print has been given, in addition to images to each of which order information to request one or more prints has been given.

According to the above aspects of the present invention, as for each data folder provided in the image data storage section, the operator who inputs order information with the inputting unit can be informed whether or not at least one of order information on the image data files stored in the data folder, and the storage contents of the data folder, can be changed.

According to still another aspect of the present invention, the system preferably further comprises a status information changing section that changes status information being stored in the status information storage section, when print processing has been started for image data files contained in the data folder, corresponding to images to each of which order information to request one or more prints has been given. According to this aspect, the status information being stored in the status information storage section from information indicating that print processing has not yet bee started, into information indicating that print processing has bee started.

According to still another aspect of the present invention, the system may further comprise a print information changing section that changes at least one of order information being stored in the order information storage section, and storage contents of the data folder, if the status information on the data folder indicates that print processing has not yet been started, when print information containing one or more image data files corresponding to the data folder and order information given to the image data files, was changed by operating the inputting unit.

According to the above aspect of the present invention, print information on prints to be made can be changed if status information on a data folder corresponding to the print information that the operator who inputs order information with the inputting unit wants to change, indicates that print processing has not yet been started.

According to still another aspect of the present invention, it is preferable that the status information storage section stores therein status information on each data folder provided in the image data storage section, as to whether or not print processing has been started for image data files contained in the data folder, corresponding to images to each of which order information to request one or more prints has been given, and as to whether or not print processing can be started if print processing has not yet been started; the judging section judges for each data folder provided in the image data storage section whether or not print processing has been started for image data files contained in the data folder, corresponding to images to each of which order information to request one or more prints has been given, and if print processing has not yet been started, as to whether or not print information containing one or more image data files corresponding to the data folder and order information given to the image data files, has been updated by operating the inputting unit; and the status information changing section changes the status information being stored in the status information storage section, so as to indicate that print processing has been started, if the judging section decides that print processing has been started, and the status information changing section changes the status information being stored in the status information storage section, so as to indicate that print processing can not be started, if the judging section decides that print processing has not yet been started and the print information has been updated by operating the inputting unit.

According to the above aspect of the present invention, print processing can be prevented from being started for image data files contained in a data folder corresponding to print information that the operator who inputs order information with the inputting unit wants to change.

According to still another aspect of the present invention, the image data storage section may store an image data file corresponding to print information containing one or more image data files corresponding to a data folder and order information given to the image data files, in a new folder, if the print information has been changed by operating the inputting unit so as to increase the number of prints, add an image data file to be printed, or correct an image to be printed, and status information on the old data folder indicates that print processing has been started.

According to the above aspect of the present invention, if the operator who inputs order information with the inputting unit wants to change print information so as to increase the number of prints, add an image data file to be printed, or correct an image to be printed, photo prints can be made in accordance with the print information that the operator desires who inputs order information with the inputting unit, by making the photo prints on the basis of the image data files stored in the new folder, even if the status information on the data folder corresponding to the print information, indicates that print processing has been started.

According to still another aspect of the present invention, the system preferably further comprises an informing section that informs an operator of the inputting unit that print processing has been started, if print information containing one or more image data files corresponding to a data folder and order information given to the image data files, has been changed by operating the inputting unit, and the status information on the data folder indicates that print processing has been started.

In the case that print processing has been started, even if the operator who inputs order information with the inputting unit wants to change print information so as to decrease the number of prints or eliminate an image to be printed, the print information on prints to be made can not be changed. In addition, if the operator who inputs order information with the inputting unit wants to change order information so as to correct an image to be printed, the change can not be reflected for the image data files for which print processing has been started. According to the above aspect of the present invention, by informing the operator who inputs order information with the inputting unit, that print processing has been started, the operator who inputs order information with the inputting unit can be warned when he or she changes print information so as to decrease the number of prints, eliminate an image to be printed, or correct an image to be printed, as described above.

According to still another aspect of the present invention, it is preferable that the status information storage section stores therein status information on each data folder provided in the image data storage section, as to whether or not print processing has been started for image data files contained in the data folder, corresponding to images to each of which order information to request one or more prints has been given, and as to whether or not print processing started has ended; the judging section judges for each data folder provided in the image data storage section whether or not print processing has been started for image data files contained in the data folder, corresponding to images to each of which order information to request one or more prints has been given, and whether or not print processing started has ended; and the status information changing section changes the status information being stored in the status information storage section, if the judging section decides that print processing has been started or has ended.

For example, if the operator who inputs order information with the inputting unit wants to change print information on a data folder for which print processing is in progress, so as to decrease the number of prints, eliminate an image to be printed, or correct an image to be printed, the change desired by the operator can not be reflected on photo prints to be printed. Consequently, useless photo prints are made. According to the above aspect of the present invention, the operator who inputs order information with the inputting unit can know whether or not print processing is in progress for the data folder corresponding to the print information that the operator wants to change. Therefore, if the operator who inputs order information with the inputting unit wants to change the print information on the data folder for which print processing is in progress, so as to decrease the number of prints, eliminate an image to be printed, or correct an image to be printed, print processing can be stopped and thereby useless photo prints can be prevented from being made. Thus, by preventing the useless photo prints from being made, the cost can be reduced.

According to still another aspect of the present invention, a folder name of each data folder provided in the image data storage section may be changed in accordance with status information being stored in the status information storage section.

According to still another aspect of the present invention, the status information storage section serves also as a storage section for a folder name of each data folder provided in the image data storage section.

According to the above aspects of the present invention, the status information on each data folder can easily be checked from the folder name of the data folder.

BRIEF DESCRIPTION OF THE DRAWINGS

Other and further objects, features and advantages of the invention will appear more fully from the following description taken in connection with the accompanying drawings in which:

FIG. 17 is a view showing a receipt printed by a receipt printer shown in FIG. 2;

FIG. 24 is a view showing a message displayed on the display shown in FIG. 4 to urge that print processing be interrupted; and FIG. 25 is a view showing the back side of a photo print made by the photo processing apparatus shown in FIG. 4.

DESCRIPTION OF THE PREFERRED EMBODIMENTS

Figure 1:
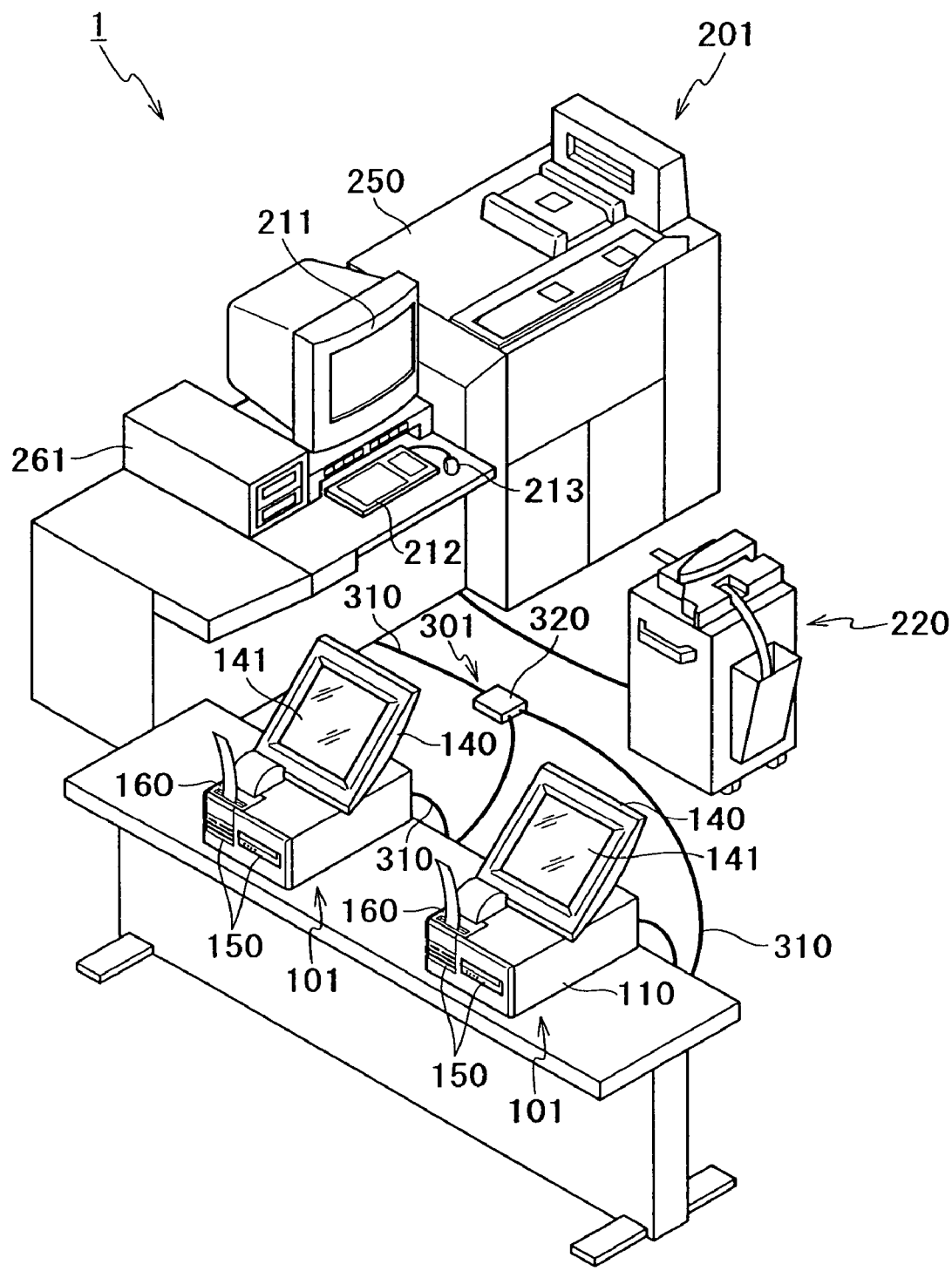
FIG. 1 is a view showing a general constitution of a printing system according to an embodiment of the present invention.

Hereinafter, embodiments of the present invention will be described with reference to the accompanying drawings. FIG. 1 is a view showing a general constitution of a printing system according to an embodiment of the present invention.

As shown in FIG. 1, the printing system 1 includes two print order accepting apparatuses 101 for accepting orders of photo prints from customers; and a photo processing apparatus 201 for making the photo prints. The printing system 1 of this embodiment is constructed by connecting two print order accepting apparatuses 101 to the existing photo processing apparatus 201 in a DP store through a data transmission network 301 including cables 310 and a hub 320 for Ethernet connection.

In the printing system 1, when a customer sets in a print order accepting apparatus 101 a recording medium brought by the customer and recording thereon image data files obtained by photographing with a digital camera, the print order accepting apparatus 101 reads out the image data files from the set medium. The recording medium is, for example, one of a Smart Media (registered trademark), a Compact Flash (registered trademark), a memory stick (registered trademark), a CD-R, and an MO, on which image data files are personally stored. The print order accepting apparatus 101 then sends to the photo processing apparatus 201 the image data files and order information on print size, the number of prints, and correction value, as will be described later, input by the customer for the image data files. The photo processing apparatus 201 then makes photo prints on the basis of the image data files and the order information received from the print order accepting apparatus 101.

Figure 2:
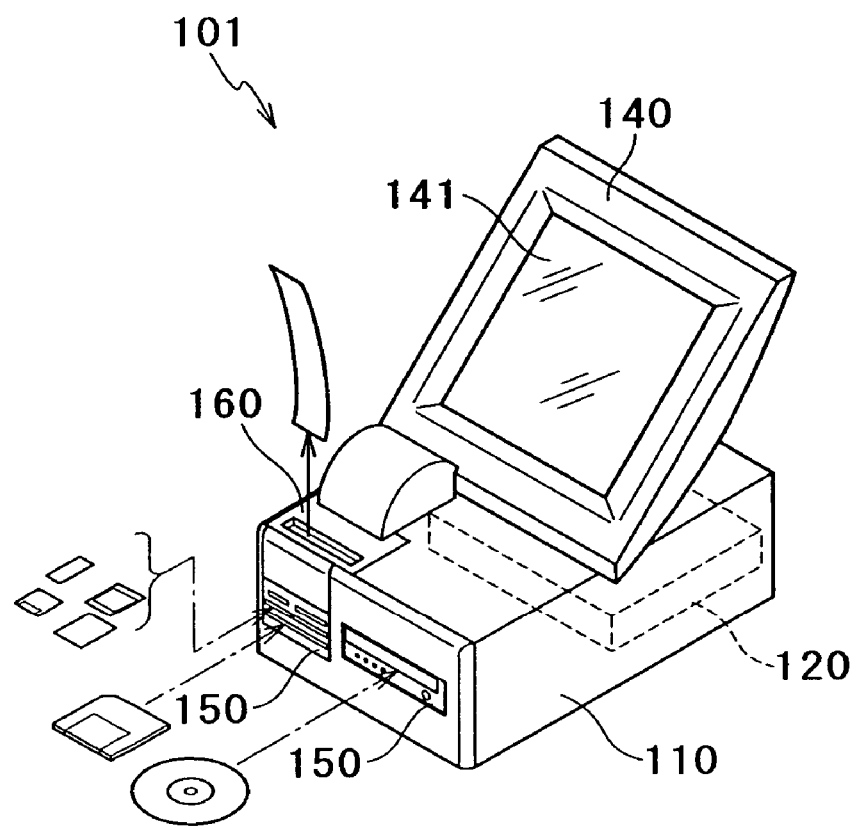
FIG. 2 is a view showing a general construction of a print order accepting apparatus shown in FIG. 1.

As shown in FIG. 2, each print order accepting apparatus 101 includes a casing 110 and a display 140. The casing 110 houses therein a controller 120 for controlling the print order accepting apparatus 101. The display 140 is disposed on the upper face of the casing for displaying thereon various kinds of information on the print order accepting apparatus 101 to inform the operator, that is, a customer. A touch panel 141 is formed in the front face of the display 140 for inputting order information and so on. A plurality of media drives 150 to cope with various kinds of recording media are provided in the front face of the casing 110. Each media drive 150 reads out image data files recorded on a medium set in the drive. A receipt printer 160 is provided on the upper face of the casing for printing a receipt.

Figure 3:
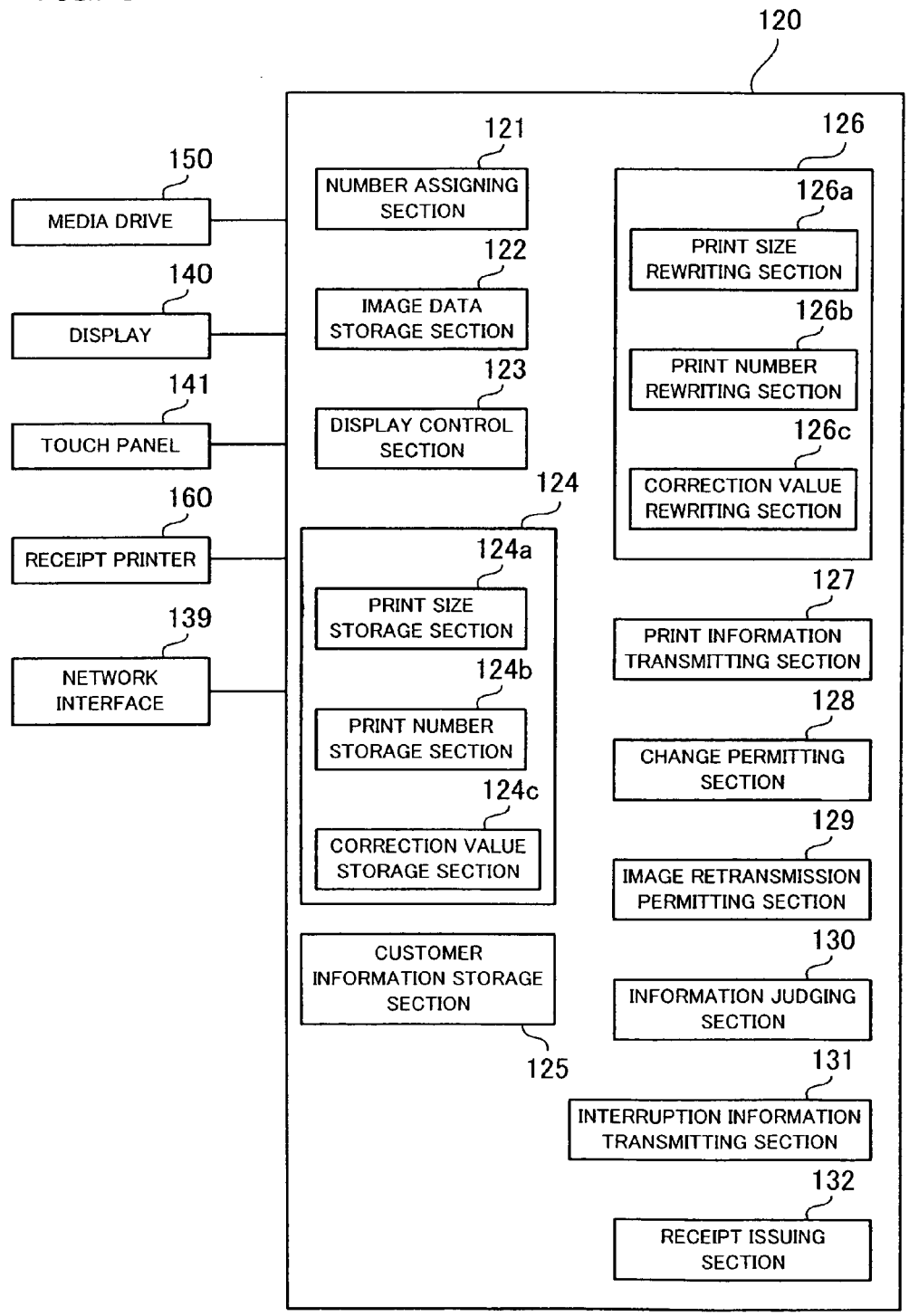
FIG. 3 is a block diagram showing a constitution of a principal part of a controller shown in FIG. 2.

FIG. 3 shows a constitution of a principal part of the controller 120. As shown in FIG. 3, a network interface 139 is connected to the controller 120 for connection to the data transmission network 301. The controller 120 includes a number assigning section 121, an image data storage section 122, a display control section 123, an order information storage section 124, a customer information storage section 125, an order information rewriting section 126, a print information transmitting section 127, a change permitting section 128, an image retransmission permitting section 129, an information judging section 130, an interruption information transmitting section 131, and a receipt issuing section 132.

The number assigning section 121 assigns docket numbers constituted by an order number and branch numbers to a plurality of image data files read out by a media drive 150 and order information input by the customer for the image data files. Order information is assigned the same docket number as the image data file corresponding to the order information. The order number is a number common to a plurality of image data files ordered in a lump by the customer, that is, a plurality of image data files recorded on the medium brought by the customer. Each branch number is a number common to an image data file group corresponding to a plurality of thumbnail images displayed at once on an order screen 40 as will be described later with reference to FIGS. 11 and 12. In this embodiment, eight frames of thumbnail images can be displayed at once on the order screen 40. Thus, a common branch number is assigned as one image data file group to image data files corresponding to eight frames of images. An image data file group that is allowed by the image retransmission permitting section 129 to be retransmitted, as will be described later in detail, is given a branch number different from the number at the time of the previous transmission.

Figure 18:
FIG. 18 is a representation of a directory construction in an image data storage section shown in FIG. 3.

The image data storage section 122 stores therein a plurality of image data files read out by each media drive 150, and docket numbers assigned to the respective image data files by the number assigning section 121. FIG. 18 shows a directory construction in the image data storage section 122. As shown in FIG. 18, in the present example, twenty image data files Image001.jpg-Image020.jpg are read out from a medium. The image data storage section 122 divides the twenty image data files into three image data file groups Image001.jpg-Image008.jpg, Image009.jpg-Image016.jpg, and Image017.jpg-Image020.jpg, and stores them in data folders. The folder names of the data folders to store therein the image data file groups contain the docket numbers assigned to the image data files by the number assigning section 121. As shown in FIG. 18, in this example, the order number for the image data files Image001.jpg-Image020.jpg is 0000012, and the branch numbers of three image data file groups Image001.jpg-Image008.jpg, Image009.jpg-Image016.jpg, and Image017.jpg-Image020.jpg, are 01, 02, and 03, respectively.

Figure 8:
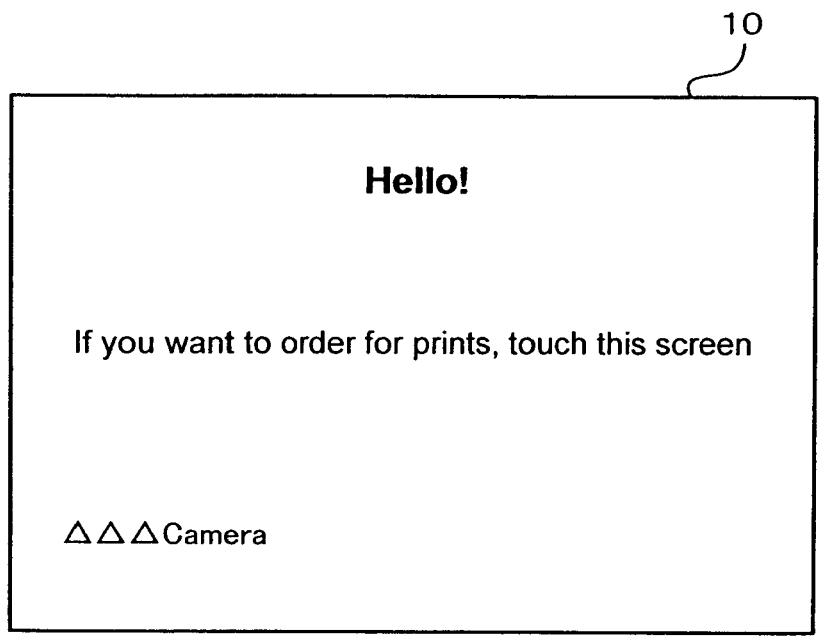
FIG. 8 is a view showing an initial screen displayed on a display shown in FIG. 2.
Figure 9:
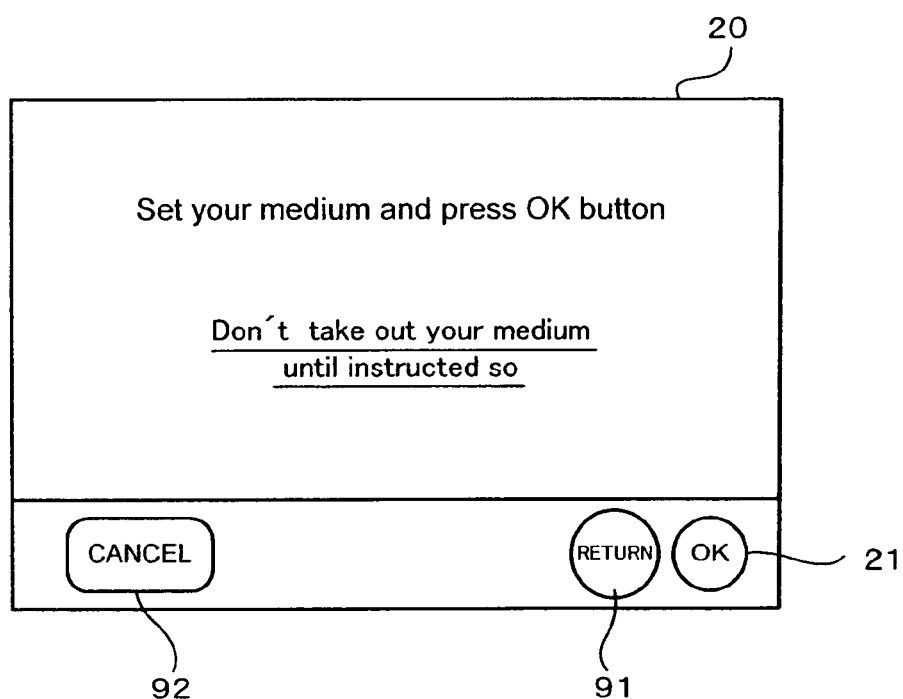
FIG. 9 is a view showing a medium set guidance screen displayed on the display shown in FIG. 2.
Figure 10:
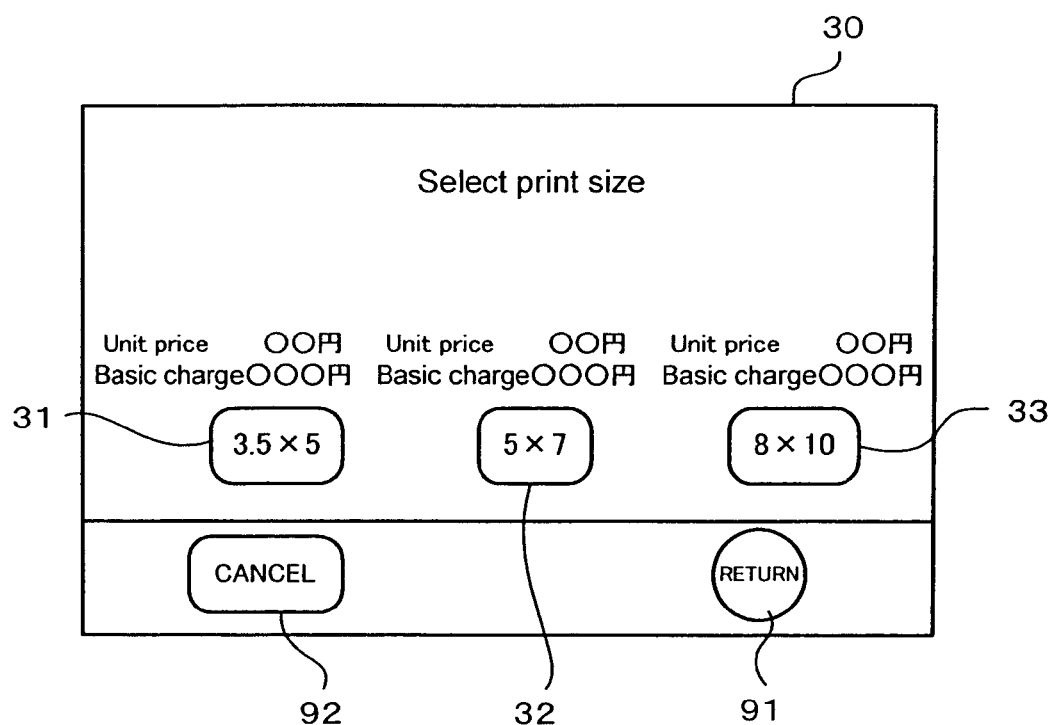
FIG. 10 is a view showing a print size selection screen displayed on the display shown in FIG. 2.
Figure 11:
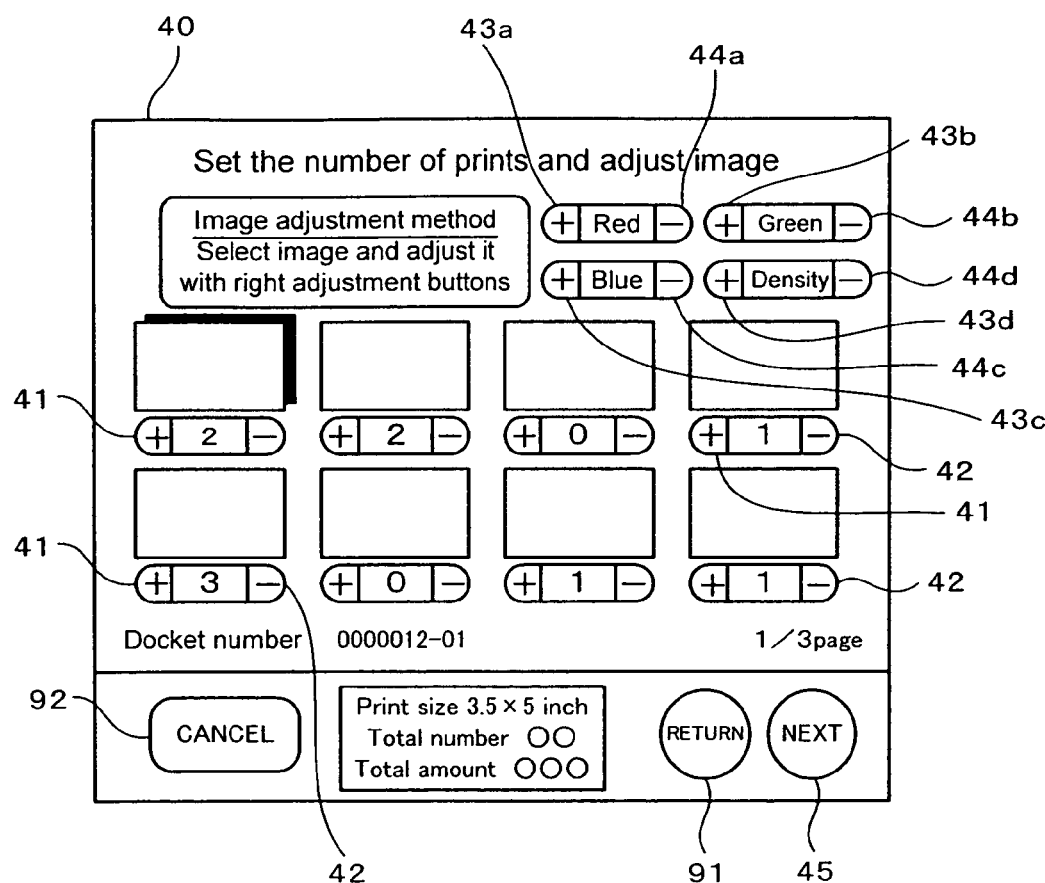
FIG. 11 is a view showing an order screen displayed on the display shown in FIG. 2.
Figure 12:
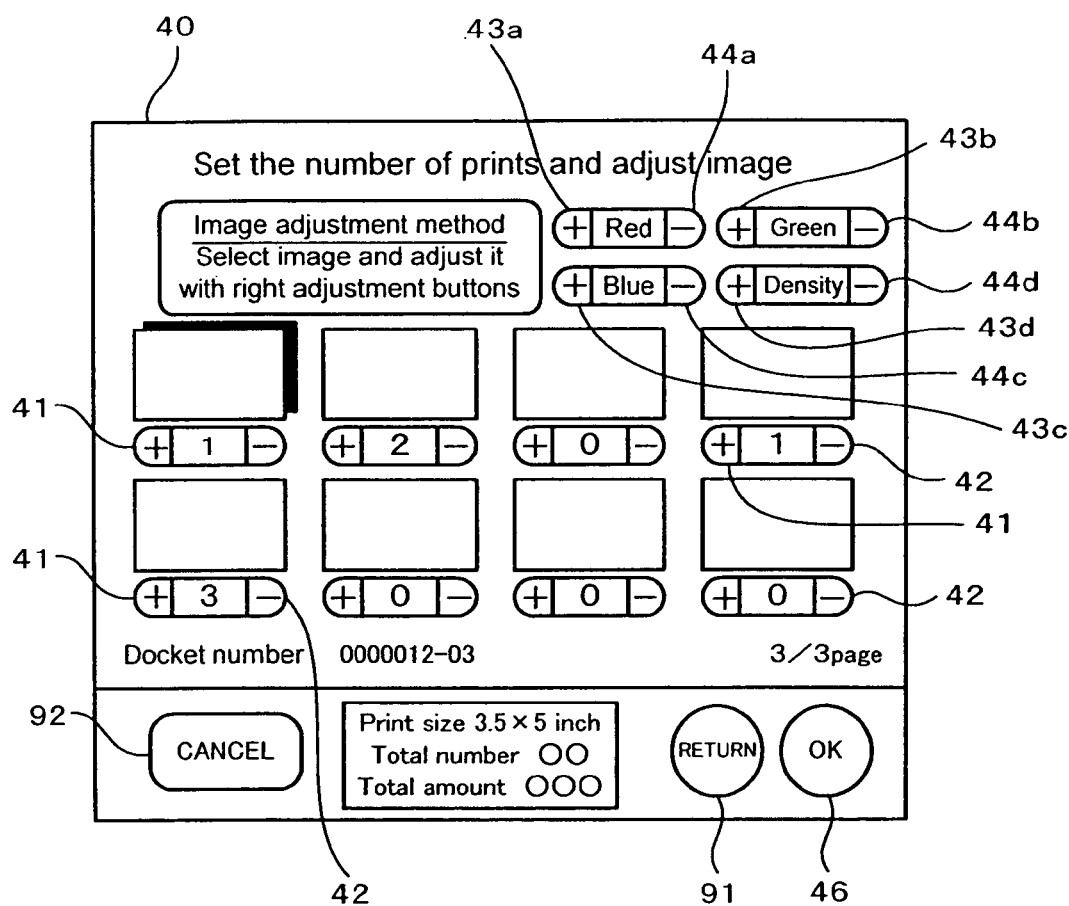
FIG. 12 is a view showing the final page of the order screen displayed on the display shown in FIG. 2.
Figure 13:
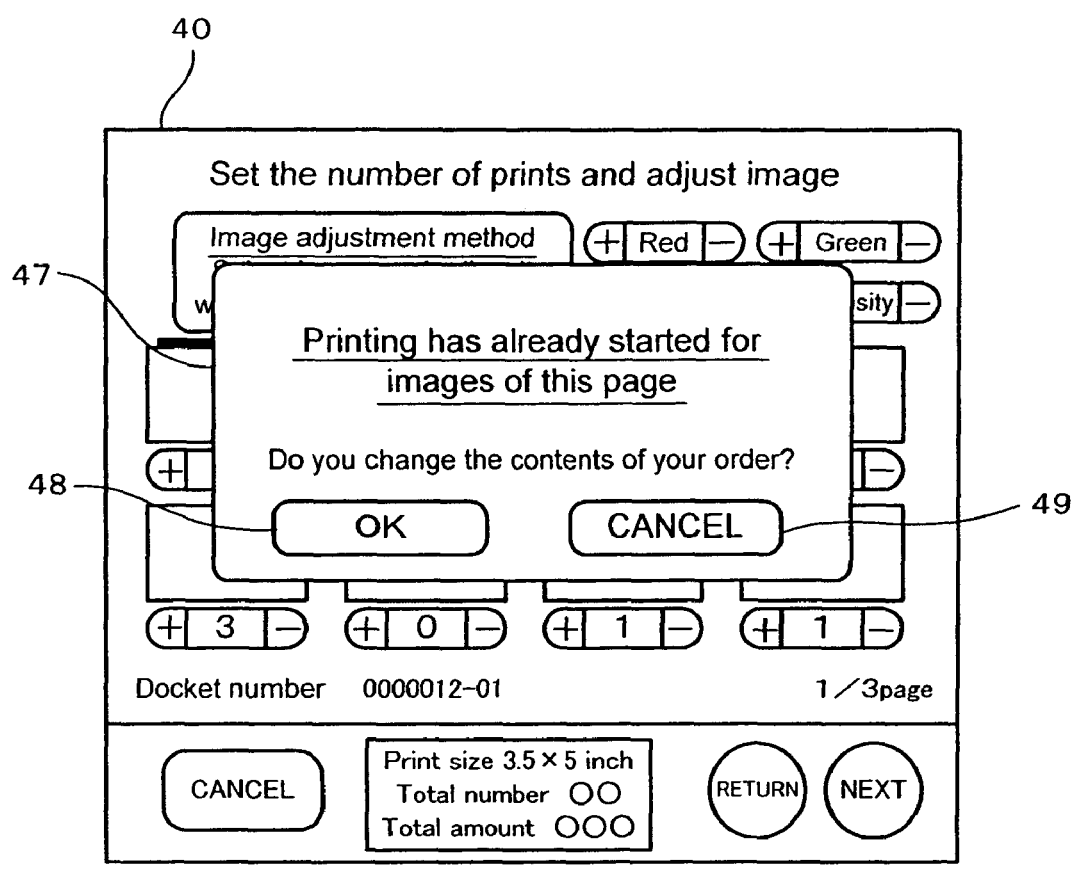
FIG. 13 is a view showing a message to inform the customer that print processing has been started for the image data files corresponding to the thumbnail images included in the order screen shown in FIG. 11.
Figure 14:
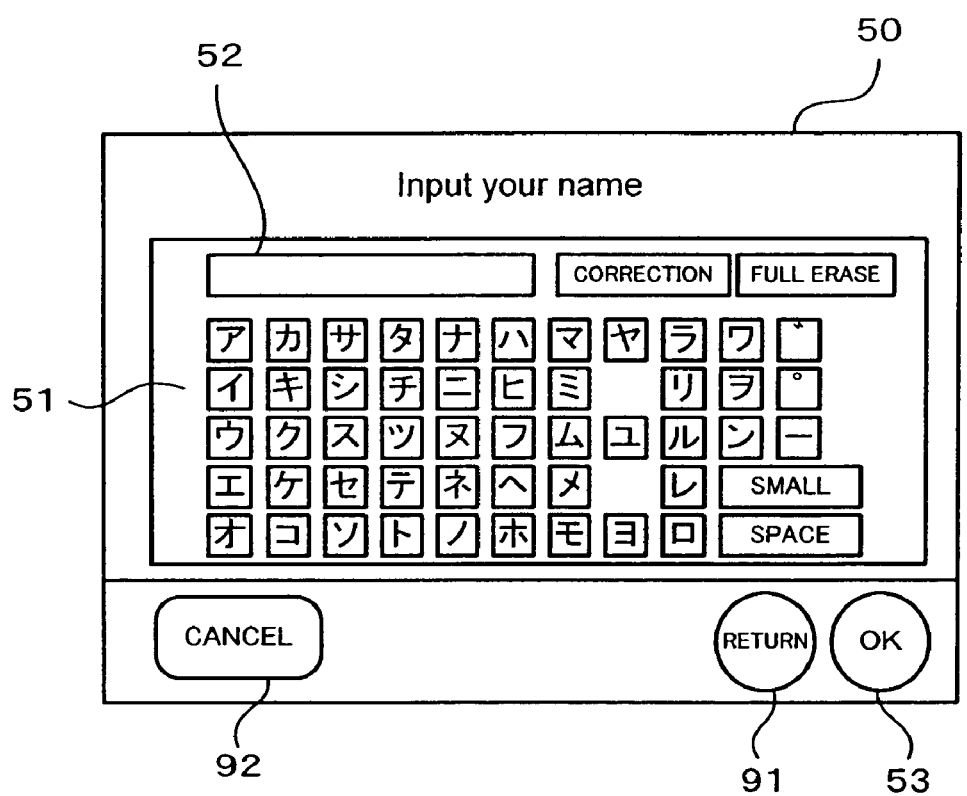
FIG. 14 is a view showing a name input screen displayed on the display shown in FIG. 2.
Figure 15:
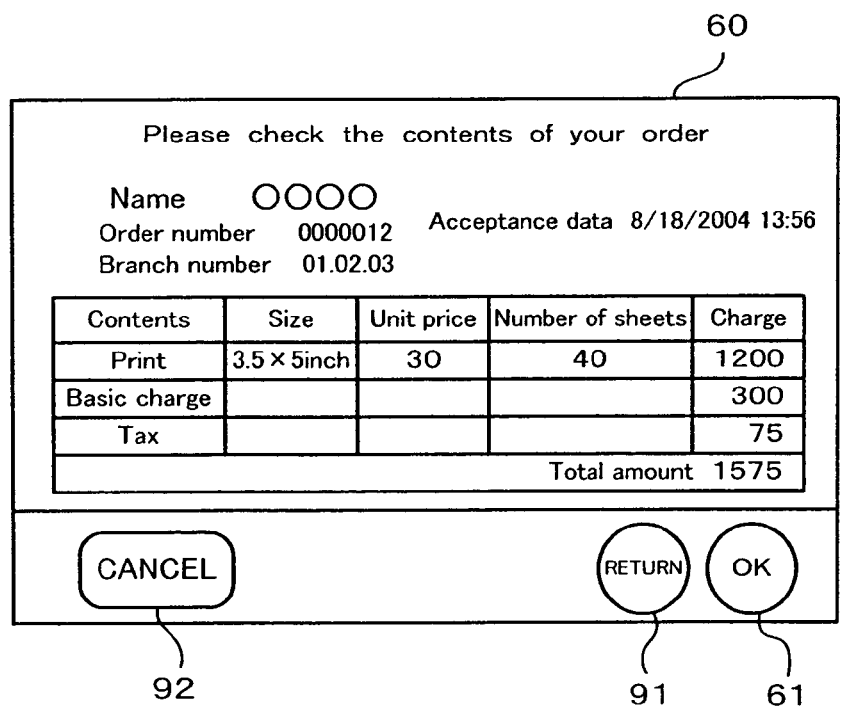
FIG. 15 is a view showing an order contents check screen displayed on the display shown in FIG. 2.
Figure 16:
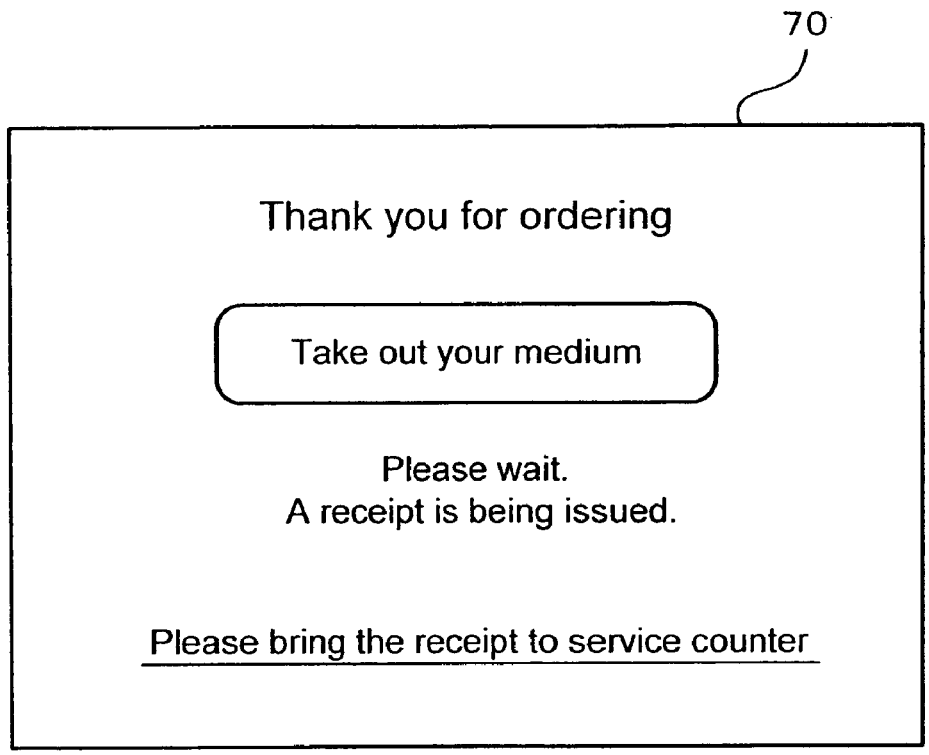
FIG. 16 is a view showing a receipt issuance screen displayed on the display shown in FIG. 2.

The display control section 123 allows the display 140 to display thereon an initial screen 10 as shown in FIG. 8, a medium set guidance screen 20 as shown in FIG. 9, a print size selection screen 30 as shown in FIG. 10, order screens 40 as shown in FIGS. 11 and 12, a message 47 as shown in FIG. 13, a name input screen 50 as shown in FIG. 14, an order contents check screen 60 as shown in FIG. 15, and a receipt issuance screen 70 as shown in FIG. 16, which will be described later in detail. The display control section 123 switches an order screen 40 containing eight frames of thumbnail images into another order screen 40 containing images that have not yet been displayed on the previous order screen or screens 40, of a plurality of images corresponding to a plurality of image data files stored in the image data storage section 122.

The order information storage section 124 stores therein order information input by a customer through the touch panel 141 for each image data file, and a docket number assigned to the order information by the number assigning section 121. The order information storage section 124 includes therein a print size storage section 124a for storing sizes of photo prints ordered by the customer; a print number storage section 124b for storing the number of prints of each of a plurality of images corresponding to a plurality of image data files stored in the image data storage section 122; and a correction value storage section 124c for storing correction values for colors of red (R), green (G), and blue (B) and the color densities of each image data file. In this embodiment, the print size storage section 124a is set by default such that each print is made in a size of about 3.5 inch×5 inch. In addition, the print number storage section 124b is set by default such that one print is made for each image. Further, the correction value storage section 124c stores therein each correction value of zero by default. The customer information storage section 125 stores therein a name input by the customer through the name input screen 50 as shown in FIG. 14.

The order information rewriting section 126 includes a print size rewriting section 126a, a print number rewriting section 126b, and a correction value rewriting section 126c. The print size rewriting section 126a rewrites the print size stored in the print size storage section 124a into a print size selected by the customer through the print size selection screen 30 as shown in FIG. 10. The print number rewriting section 126b rewrites the number of prints for each image stored in the print number storage section 124b into the number of prints input by the customer for each image through the order screens 40 as shown in FIGS. 11 and 12. The correction value rewriting section 126c rewrites the correction values for each image data file stored in the correction value storage section 124c into correction values input by the customer for each image through the order screens 40 as shown in FIGS. 11 and 12.

When the customer operates the touch panel 141 to change the present order screen 40 containing eight frames of thumbnail images into another order screen 40 containing other thumbnail images, and when the customer operates the touch panel 141 to change the order screen 40 into the name input screen 50, the print information transmitting section 127 transmits to the photo processing apparatus 201 the image data file group corresponding to the thumbnail images displayed on the order screen 40 at the time when the customer operates the touch panel 141, order information input by the customer for the thumbnail images, and the docket number assigned to the image data file group (hereinafter referred to as "print information" as a generic term). Any image data file unnecessary to be printed, that is, for which the number of prints stored in the print number storage section 124b is zero, is not transmitted to the photo processing apparatus 201.

When the customer operated an order screen 40 to change print information corresponding to a data folder storing therein an image data file group transmitted from the print order accepting apparatus 101 to the photo processing apparatus 201, the change permitting section 128 permits a change signal for the print information to be transmitted to the photo processing apparatus 201 if status information on the data folder, which will be described later in detail, indicates that printing has not yet been started. In this embodiment, the change signal for print information means changed order information when the customer operated an order screen 40 to change order information; or an image data file to be added when the customer operated an order screen 40 to add a print image. The change signal may contain both of the changed order information and the image data file to be added.

When the customer operated an order screen 40 to change print information corresponding to a data folder storing therein an image data file group transmitted from the print order accepting apparatus 101 to the photo processing apparatus 201, so as to increase the number of prints, add an image data file to be printed, or increase/decrease a correction value, the image retransmission permitting section 129 permits the image data file group on which the print information has been changed, and the order information on the image data file to be transmitted to the photo processing apparatus 201 if status information on the data folder, which will be described later in detail, indicates that printing has been started.

When the customer operated an order screen 40 to change print information corresponding to a data folder storing therein an image data file group transmitted from the print order accepting apparatus 101 to the photo processing apparatus 201, the information judging section 130 judges whether or not status information on the data folder, which will be described later in detail, indicates that printing has been started. When the status information indicates that printing has been started, the information judging section 130 instructs the display control section 123 to display on the display 140 a massage 47 to inform the customer of that effect, as shown in FIG. 13.

When the customer operated an order screen 40 to change print information corresponding to a data folder storing therein an image data file group transmitted from the print order accepting apparatus 101 to the photo processing apparatus 201, so as to decrease the number of prints, eliminate an image to be printed, or increase/decrease a correction value, the interruption information transmitting section 131 transmits to the photo processing apparatus 201 a text file containing a message to urge the operator of the photo processing apparatus 201 to interrupt print processing for the data folder, as shown in FIG. 23, if status information on the data folder, which will be described later in detail, indicates that printing is in progress. Hereinafter, such a text file may be simply referred to as interruption information.

The receipt issuing section 132 controls the receipt printer 150 to print a receipt as shown in FIG. 17. As shown in FIG. 17, the receipt is printed to contain a terminal ID for specifying the used print order accepting apparatus 101; the name of the customer stored in the customer information storage section 125; an order number and branch numbers assigned by the number assigning section 121; a print size and the number of prints stored in the order information storage section 124; the charge of the photo prints ordered by the customer; and so on.

Figure 4:
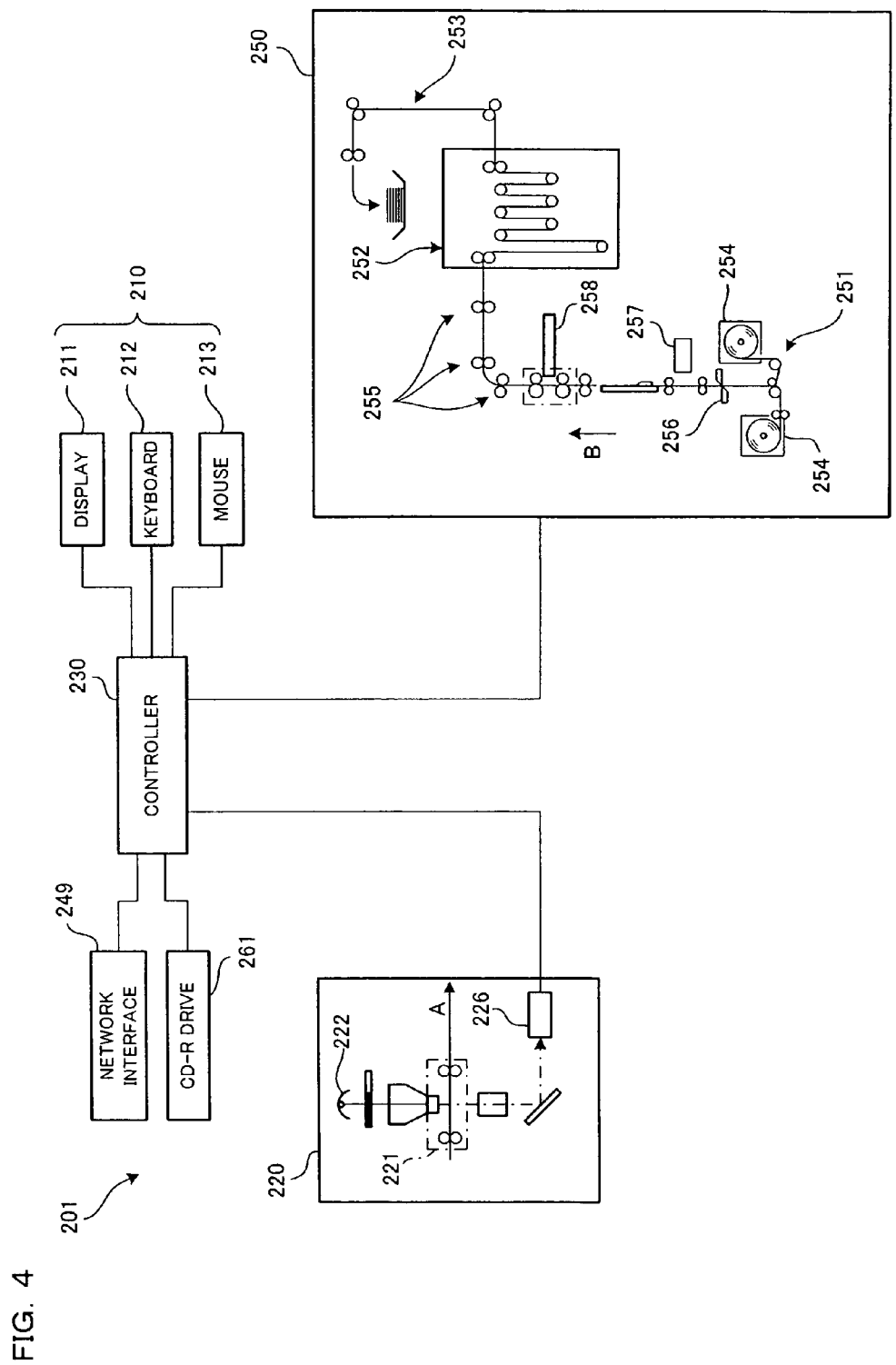
FIG. 4 is a diagram showing a general construction of a photo processing apparatus shown in FIG. 1.

Next, a general construction of the photo processing apparatus 201 will be described with reference to FIG. 4. As shown in FIG. 4, the photo processing apparatus 201 includes an interface unit 210, a film scanner 220, a controller 230, and a printer processor 250.

The interface unit 210 is used for exchanging information between the photo processing apparatus 201 and the operator who is operating the photo processing apparatus 201. The interface unit 210 includes a display 211 for displaying thereon various kinds of information on the photo processing apparatus 201 to inform the operator; and input devices such as a keyboard 212 and a mouse 213 for the operator to give instructions to the photo processing apparatus 201.

The film scanner 220 includes a film carrier 221, a light source 222, a CCD line sensor unit 226, and a not-shown processing circuit. The film carrier 221 conveys a photo film at a constant speed in an auxiliary scanning direction as shown by an arrow A in FIG. 4. The light source 222 applies lights to the photo film being conveyed by the film carrier 221. The CCD line sensor unit 226 is disposed so as to receive lights having passed through the photo film, and photoelectrically converts a frame image on the photo film. The processing circuit processes an output signal of the CCD line sensor unit 226.

The CCD line sensor unit 226 includes three CCD line sensors arranged in parallel. Each CCD line sensor has thereon about 5000 light receiving elements arranged along the width of the photo film. Color filters for red, green, and blue, are formed on the light receiving surface of each CCD line sensor. A frame image on the photo film is separated in color by the color filters and then detected. The processing circuit amplifies an output analogue signal of the CCD line sensor unit 226, A/D-converts the signal, and then outputs the converted signal. Thus, in the film scanner 220, when a photo film is set on the film carrier 221, frame images on the photo film being conveyed are read out in order, and a digital image data file for each of red, green, and blue, is sent to the controller 230.

The controller 230 controls the photo processing apparatus 201. The controller 230 is connected to a network interface 249 for connection to the data transmission network 301. Further, the controller 230 is connected also to a CD-R drive 261 for writing on a CD-R (Compact Disc-Recordable), which can be rewritten only once.

Because the CD-R drive 261 is connected, the photo processing apparatus 201 of this embodiment can provide a service of writing on a CD-R an image data file recorded on a medium brought by a customer, or an image data file taken in through the film scanner 220. However, this feature is not so important for the present invention, and so the detailed description thereof is omitted.

Figure 5:
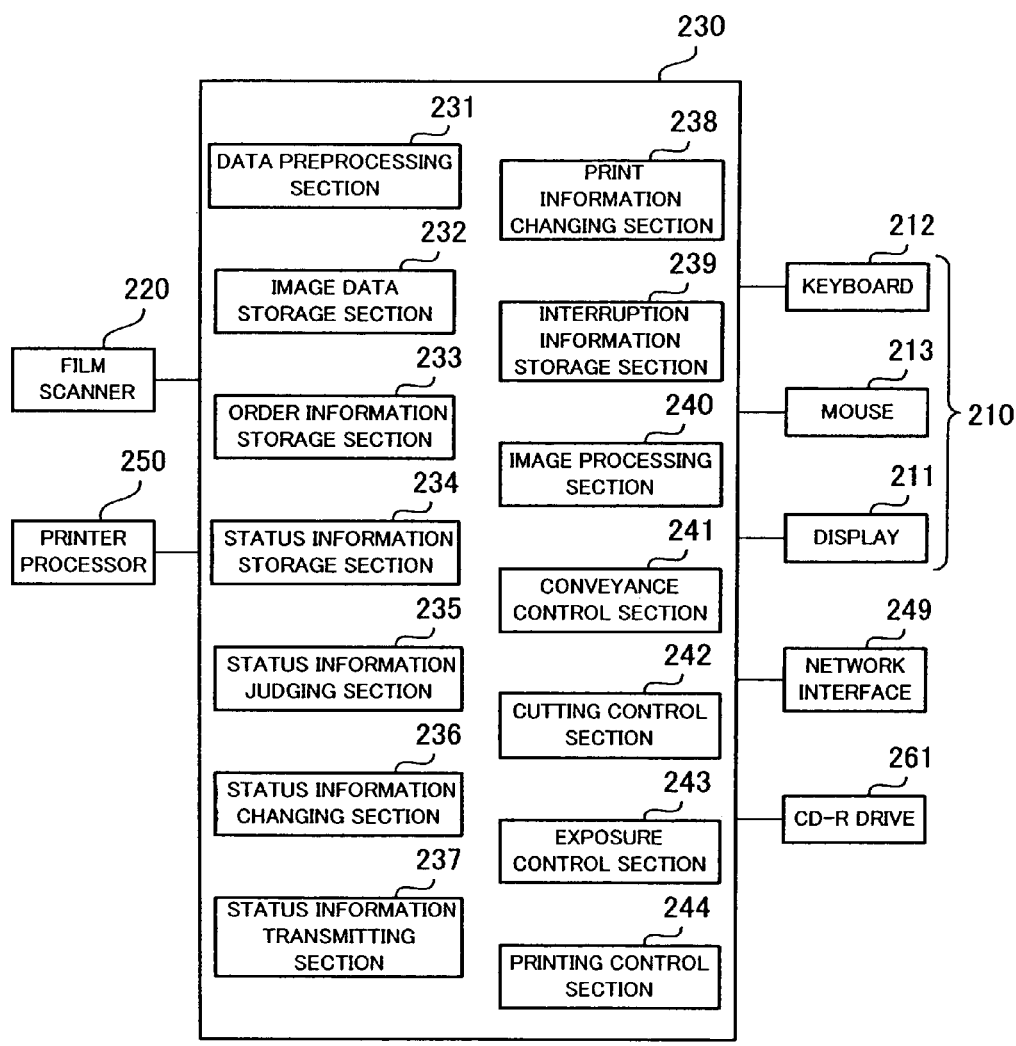
FIG. 5 is a block diagram showing a constitution of a principal part of a controller shown in FIG. 4.

FIG. 5 shows a constitution of a principal part of the controller 230. As shown in FIG. 5, the controller 230 includes a data preprocessing section 231, an image data storage section 232, an order information storage section 233, a status information storage section 234, a status information judging section 235, a status information changing section 236, a status information transmitting section 237, a print information changing section 238, an interruption information storage section 239, an image processing section 240, a conveyance control section 241, a cutting control section 242, an exposure control section 243, and a printing control section 244.

The data preprocessing section 231 separates print information received from a print order accepting apparatus 101, into image data files and order information. Each image data file is transferred to the image data storage section 232 together with the corresponding docket number. The order information is transferred to the order information storage section 233 together with the corresponding docket number.

The image data storage section 232 stores therein the image data files and their docket numbers transferred from the data preprocessing section 231. The order information storage section 233 stores therein the order information and docket number transferred from the data preprocessing section 231.

Figure 21:
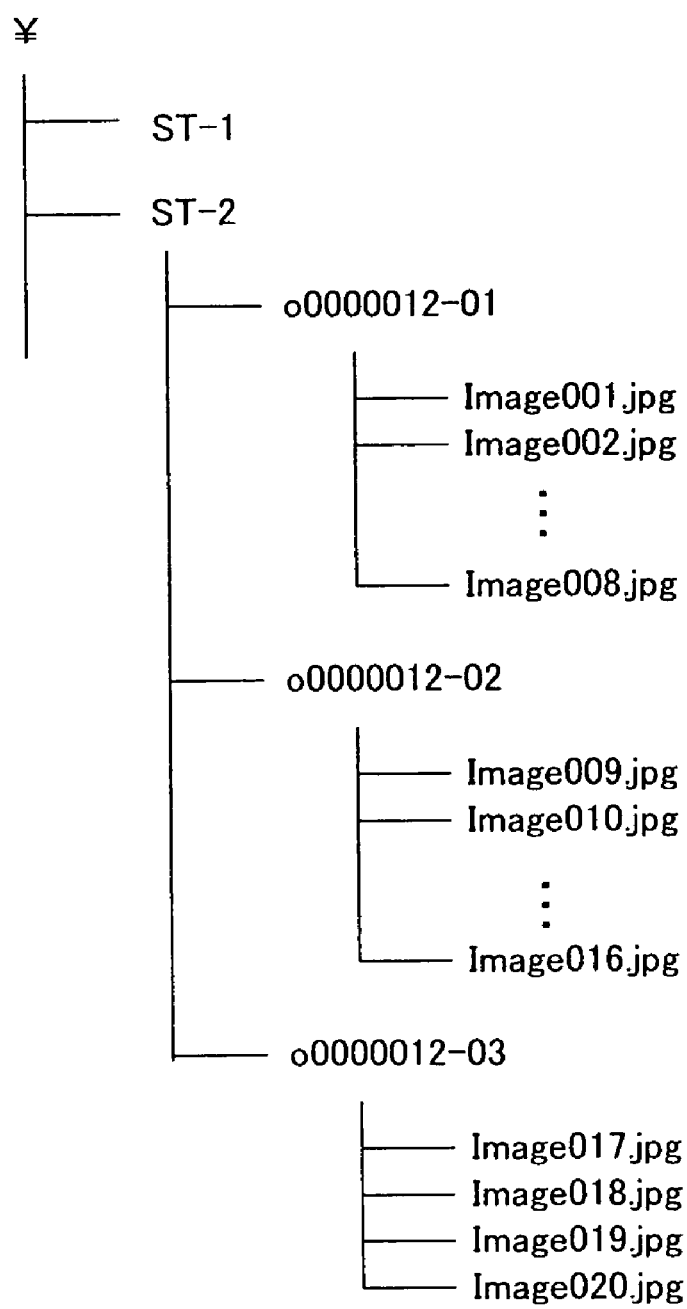
FIG. 21 is a representation of a directory construction in an image data storage section shown in FIG. 5.

FIG. 21 shows a directory construction in the image data storage section 232 of the photo processing apparatus 201. As shown in FIG. 21, in this embodiment, two data folders ST-1 and ST-2 are provided for storing therein image data files sent from two print order accepting apparatuses 101, respectively. The construction in each data folder ST-1 or ST-2 is the same as the directory construction in the image data storage section 122 of each print order accepting apparatus 101. An image data file group corresponding to a plurality of thumbnail images displayed on an order screen 40 at once, that is, an image data file group transmitted at once by the print information transmitting section 127, is stored in one data folder.

Figure 23A:
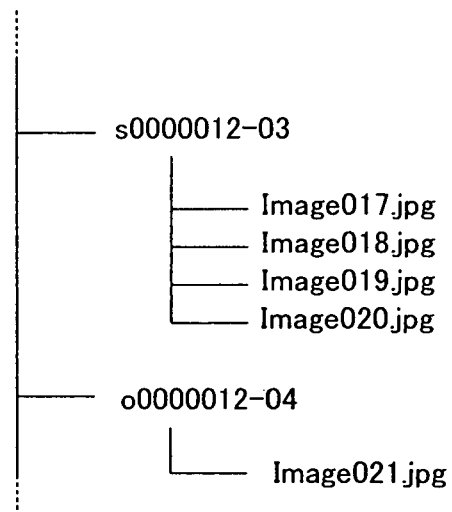
FIG. 23A is a representation of a case wherein a new folder is prepared in the directory construction shown in FIG. 21.

As shown in FIG. 23A, an image data file Image021.jpg permitted by the image retransmission permitting section 129 to be transmitted, is stored in a new data folder o0000012-04.

As shown in FIG. 21, each folder name in a data folder is constituted by status information "p", "o", "s", or "e" stored in the status information storage section 234 as will be described later in detail, and the docket number assigned to the data folder by the number assigning section 121. Thus, the folder name in the data folder is changed in accordance with status information stored in the status information storage section 234. The status information on any data folder shown in FIG. 21 is "o".

For each data folder provided in the image data storage section 232, the status information storage section 234 stores therein status information indicating whether or not print processing using an image data file included in the data folder has been started; whether or not print processing can be started when print processing is not yet started; whether or not print processing has ended when print processing was started. More specifically, when print processing is not yet started, "o" is stored if print processing can be started, and "p" is stored if print processing can not be started. When print processing was started, "s" is stored if print processing has not yet ended, that is, print processing is in progress, and "e" is stored if print processing has ended. By default, the status information storage section 234 stores therein "o" as status information on any folder.

For each data folder provided in the image data storage section 232, the status information judging section 235 judges whether or not print processing using an image data file included in the data folder has been started; whether or not a change signal has been sent from a print order accepting apparatus 101; and whether or not print processing has ended when print processing was started.

When the status information judging section 235 decided that a change signal has been sent from a print order accepting apparatus 101, the status information changing section 236 changes the status information stored in the status information storage section 234 into "p". When the status information judging section 235 decided that print processing was started and is in progress, the status information changing section 236 changes the status information stored in the status information storage section 234 into "s". When the status information judging section 235 decided that print processing has ended, the status information changing section 236 changes the status information stored in the status information storage section 234 into "e".

The status information transmitting section 237 transmits to a print order accepting apparatus 101 the status information on each data folder stored in the status information storage section 234. In this embodiment, when the status information changing section 236 changed the status information on each data folder stored in the status information storage section 234, the status information transmitting section 237 transmits the status information on the data folder.

On the basis of a change signal sent from a print order accepting apparatus 101, the print information changing section 238 changes at least one of order information stored in the order information storage section 233, and the storage contents of a data folder provided in the image data storage section 232. More specifically, when the change signal contains order information changed by the customer, the print information changing section 238 changes the order information stored in the order information storage section 233. When the change signal contains an image data file added by the customer, the print information changing section 238 adds the image data file in the data folder provided in the image data storage section 232.

Figure 22A:
FIG. 22A is a representation of a case wherein an image data file is added in a data folder provided in the image data storage section shown in FIG. 5 (before addition)
Figure 22B:
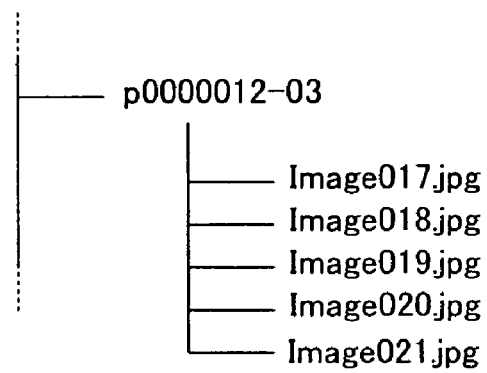
FIG. 22B is a representation of the case wherein the image data file is added in the data folder provided in the image data storage section shown in FIG. 5 (in the course of addition)
Figure 22C:
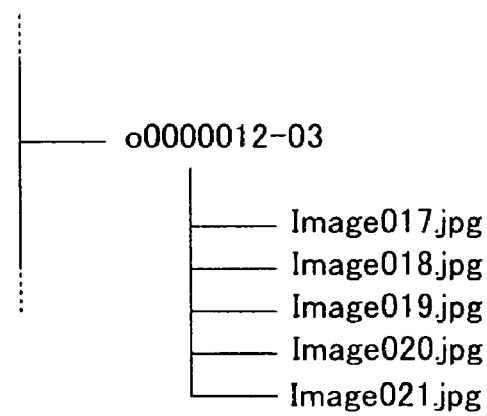
FIG. 22C is a representation of the case wherein the image data file is added in the data folder provided in the image data storage section shown in FIG. 5 (after addition)

A case wherein an image data file is added in a data folder o0000012-03 storing therein four image data files Image017.jpg-Image020.jpg, will be described with reference to FIGS. 22A to 22C. First, the status information changing section 236 changes status information indicating that print processing has not yet been started and print processing can be started, into status information indicating that print processing has not yet been started and print processing can not be started. Attendant upon this, the folder name is changed from "o0000012-03" as shown in FIG. 22A into "p0000012-03" as shown in FIG. 22B. After an image data file Image021.jpg is added, the status information changing section 236 again changes the status information indicating that print processing has not yet been started and print processing can not be started, into status information indicating that print processing has not yet been started and print processing can be started. Attendant upon this, the folder name is changed from "p0000012-03" as shown in FIG. 22B into "o0000012-03" as shown in FIG. 22C.

Figure 23B:
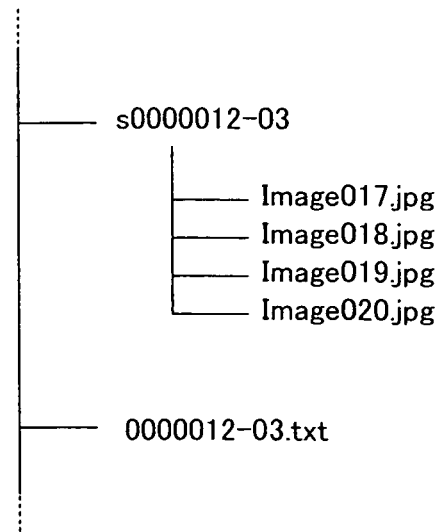
FIG. 23B is a representation of a case wherein a text file is added in the directory construction shown in FIG. 21.

The interruption information storage section 239 stores therein a text file containing a message to urge that print processing be interrupted, sent from a print order accepting apparatus 101. For example, as shown in FIG. 23B, a text file 0000012-03.txt containing a message to urge that print processing be interrupted for a data folder s0000012-03 that is being printed, is stored in the same hierarchy as the data folder s0000012-03.

The image processing section 240 applies various kinds of image processing, such as processing for changing image size so as to correspond to print size, according to need, and processing for sharpness, to an image data file stored in the image data storage section 232.

Figure 25:
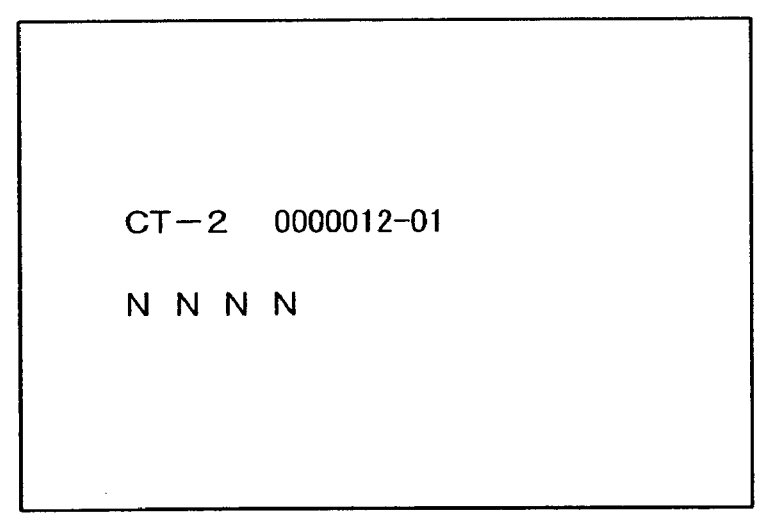

The conveyance control section 241 controls the operations of conveyance roller pairs 255 as will be described later, such that photo prints are made in accordance with order information stored in the order information storage section 233. The cutting control section 242 controls the operation of a cutter 256 as will be described later, such that photo prints are made in accordance with order information stored in the order information storage section 233. The exposure control section 243 controls an exposure unit 258 as will be described later, such that a latent image of an image corresponding to an image data file to which the image processing section 240 has applied image processing, is formed on a printing paper. The printing control section 244 controls a printing unit 257 as will be described later, such that, as shown in FIG. 25, the terminal ID of a print order accepting apparatus 101 that the customer used for his or her order, for example, "CT-2" in FIG. 25, the docket number of the image data file corresponding to the image to be formed on the emulsion surface of a printing paper, for example, "0000012-01" in FIG. 25, and correction values for color/density corrections made by the image processing section 240, for example, "NNNN" in FIG. 25, are printed on the non-emulsion surface of the printing paper, that is, the back side of the photo print.

The printer processor 250 includes a printer 251, a processor 252, and a finish processing unit 253. On the basis of an image data file to which image processing has been applied, sent from the controller 230, the printer 251 exposes a printing paper. The processor 252 applies processing of development, bleaching, stabilization, and so on, to the exposed printing paper. The finish processing unit 253 dries the printing paper discharged from the processor 252.

The printer 251 includes a paper magazine 254 in which a printing paper is set, and a plurality of conveyance roller pairs 255 for taking the printing paper out of the paper magazine 254 and conveying the printing paper. The printer 251 further includes a cutter 256, a printing unit 257, and an exposure unit 258, arranged in this order in the conveyance direction for the printing paper being conveyed by the conveyance roller pairs 255, as shown by an arrow B in FIG. 4. Thus, the printing paper taken out of the paper magazine 254 is cut by the cutter 256 into a print size, and then the docket number of the image data file and so on are printed by the printing unit 257 on the non-emulsion surface of the printing paper, as described above. The exposure unit 258 then forms on the emulsion surface of the printing paper a latent image of the image corresponding to the image data file to which the image processing section 240 has applied image processing. A proper type of exposure unit 258 can be adopted, for example, a laser exposure type, a PLZT type, or a CRT type.

The printing paper on which the latent image has been formed by the printer 251 is conveyed through the processor 252 to the finish processing unit 253, and then discharged as a finished photo print.

In the photo processing apparatus 201 of this embodiment, print processing can be performed in parallel for image data files sent from the respective two print order accepting apparatuses 101 connected through the data transmission network 301. Further, in addition to print processing for the image data files sent from the two print order accepting apparatuses 101, print processing can be performed in parallel also for an image data file sent from the film scanner 220.

Figure 6A:
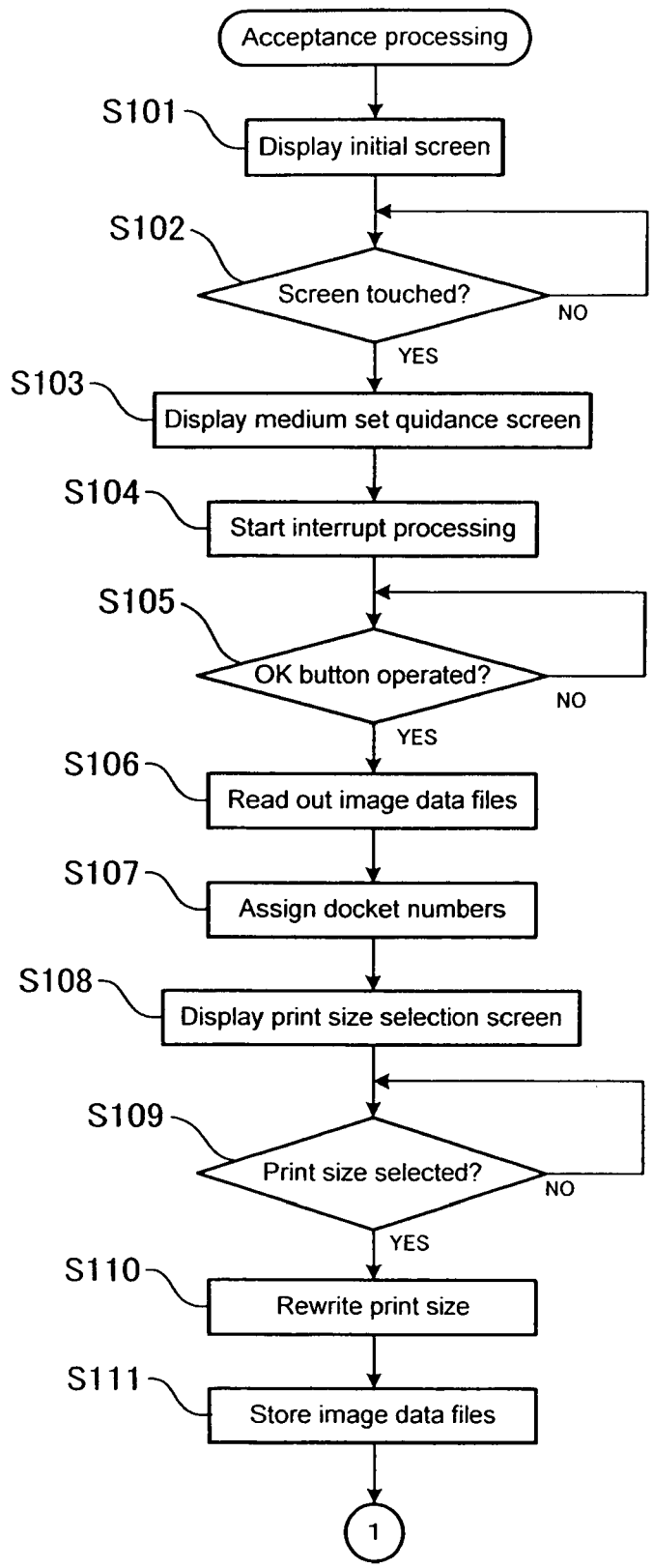
FIG. 6A is the first half of a flowchart showing a procedure for a print order accepting apparatus shown in FIG. 2 accepting an order for photo prints.
Figure 6B:
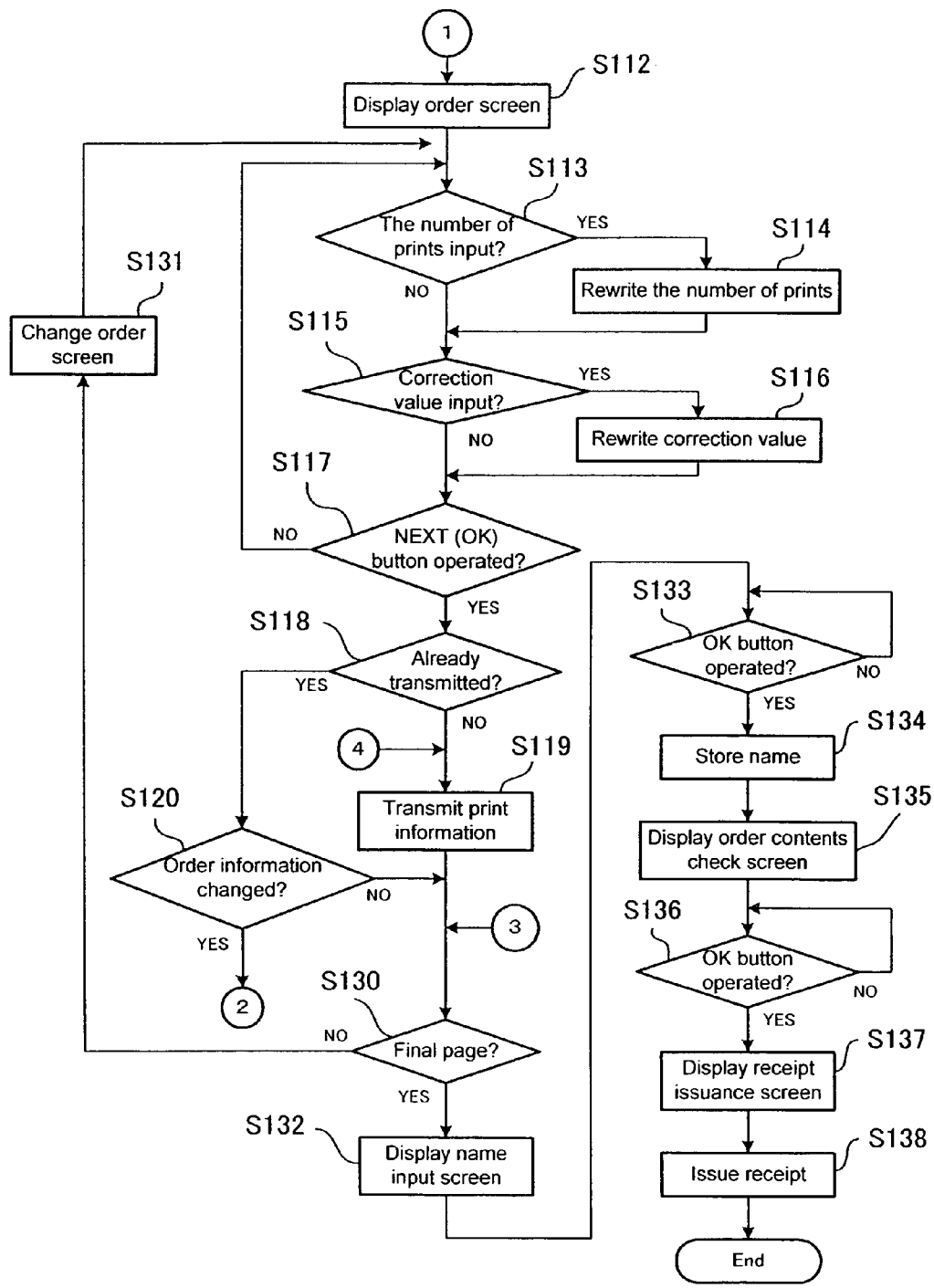
FIG. 6B is the second half of the flowchart showing the procedure for the print order accepting apparatus shown in FIG. 2 accepting an order for photo prints.
Figure 6C:
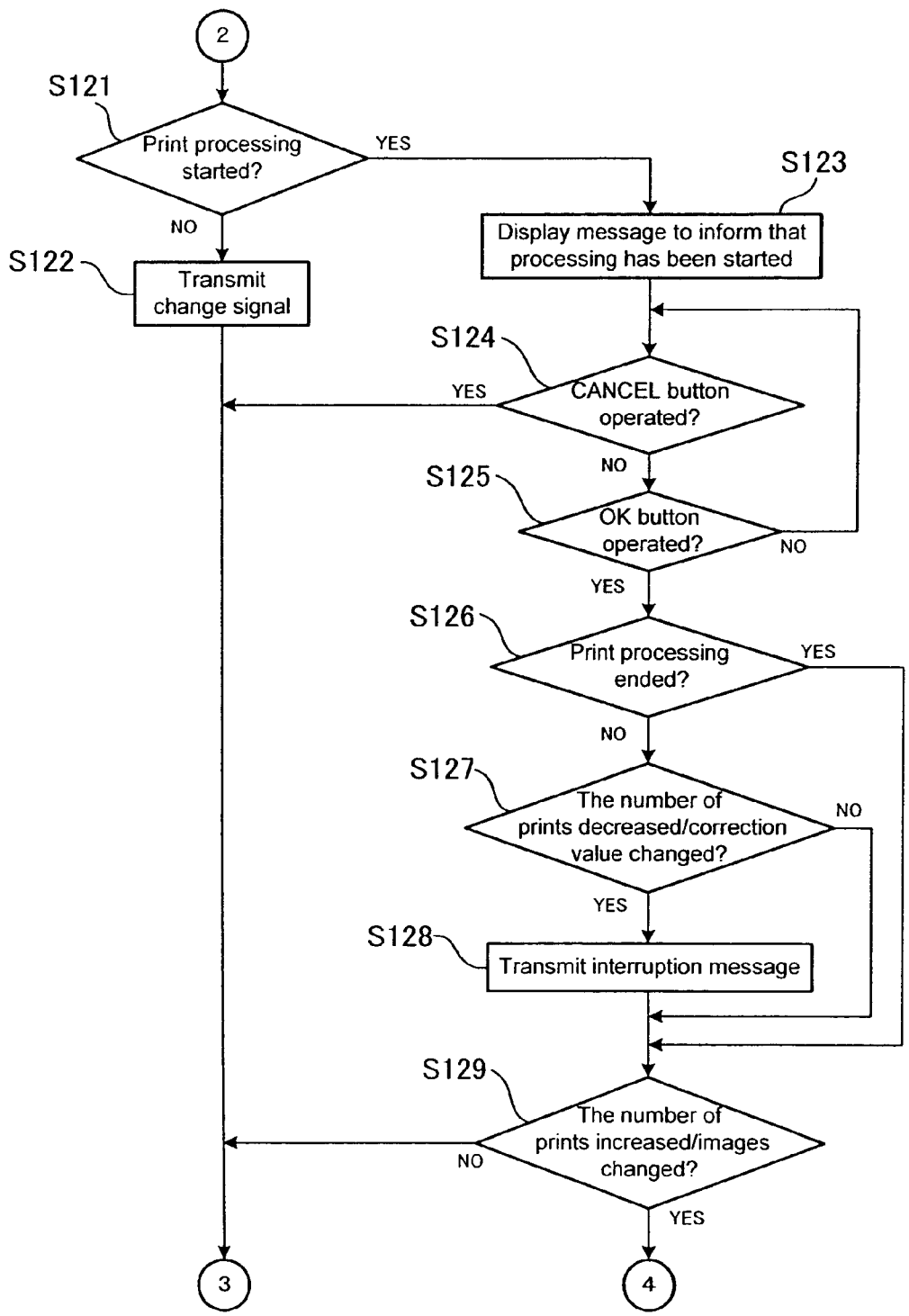
FIG. 6C is a flowchart showing a procedure for the print order accepting apparatus shown in FIG. 2 accepting an order for photo prints, in particular, when a customer changes print information.
Figure 7:
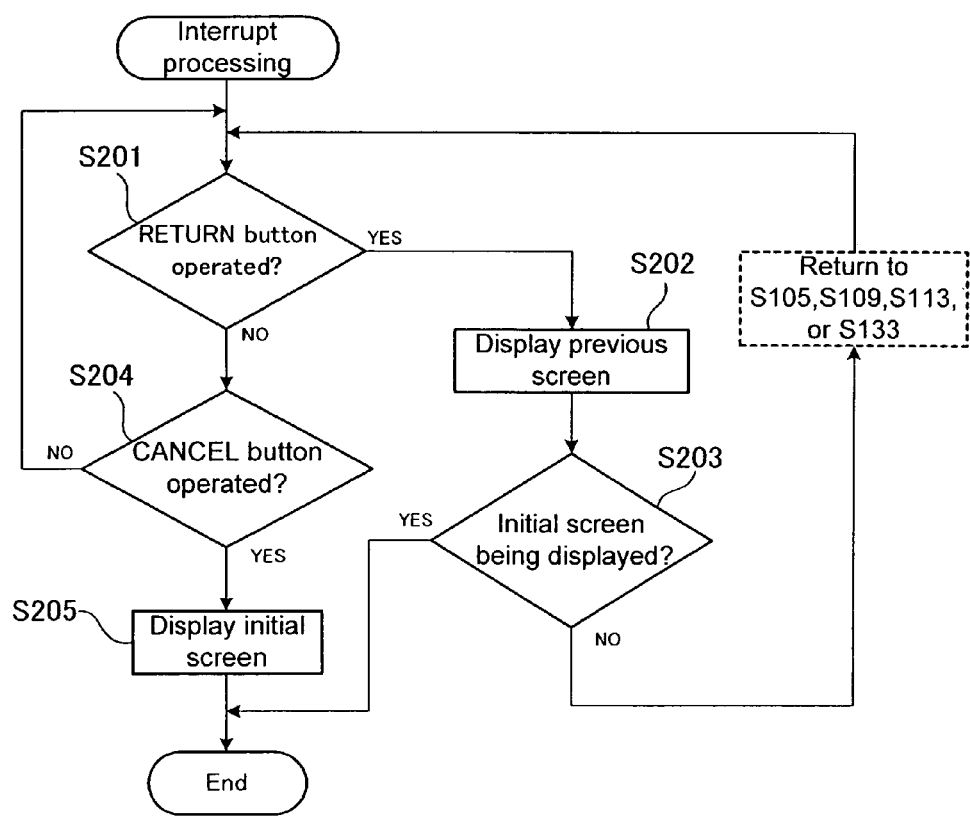
FIG. 7 is a flowchart showing a procedure of interrupt processing to be performed in the flowchart shown in FIG. 6.

Next, a procedure for making a photo print in the printing system 1 of this embodiment will be described. First, a procedure in a print order accepting apparatus 101 will be described with reference to FIGS. 6 and 7. FIGS. 6A to 6C show a flowchart of a procedure for the print order accepting apparatus 101 accepting an order for photo prints. FIG. 7 is a flowchart showing a procedure of interrupt processing to be performed in the flowchart shown in FIG. 6.

First, in Step S101, the display control section 123 controls the display 140 to display thereon an initial screen 10 as shown in FIG. 8. In the initial screen 10, as shown in FIG. 8, a message is displayed that urges a customer who wants to order for photo prints, to touch the screen of the display 140 that functions as the touch panel 141. In Step S102, it is judged whether or not the customer touched the screen of the display 140.

If it is decided that the customer did not touch the screen of the display 140, that is, NO in Step S102, the judgment of Step S102 is repeated until it is decided that the customer touched the screen of the display 140. When it is decided that the customer touched the screen of the display 140, that is, YES in Step S102, the display control section 123 controls the display 140 to display thereon a medium set guidance screen 20 as shown in FIG. 9, in Step S103. In the medium set guidance screen 20, as shown in FIG. 9, a message is displayed that urges the customer to set a medium brought by him- or herself in a media drive 150 and press an OK button 21 being displayed in a lower right portion of the screen.

Afterward, interrupt processing as will be described later in detail is started in Step S104. Subsequently, it is judged in Step S105 whether or not the OK button 21 in the medium set guidance screen 20 was operated. If it is decided that the OK button 21 was not operated, that is, NO in Step S105, the judgment of Step S105 is repeated until it is decided that the OK button 21 was operated. When it is decided that the OK button 21 was operated, that is, YES in Step S105, the media drive 150 reads out image data files recorded on the set medium, in Step S106. Further, the number assigning section 121 assigns a docket number to each of a plurality of image data files read out from the medium, in Step S107.

Subsequently, in Step S108, the display control section 123 controls the display 140 to display thereon a print size selection screen 30 as shown in FIG. 10. In the print size selection screen 30, as shown in FIG. 10, there are displayed sizes, unit prices, and basic charges for three print sizes of 3.5 inch×5 inch, 5 inch×7 inch, and 8 inch×10 inch. In addition, there are displayed a 3.5×5 selection button 31, a 5×7 selection button 32, and a 8×10 selection button 33.

Subsequently, it is judged in Step S109 whether or not a print size was selected by operating one of the 3.5×5 selection button 31, the 5×7 selection button 32, and the 8×10 selection button 33. If it is decided that any print size was not selected, that is, NO in Step S109, the judgment of Step S109 is repeated until it is decided that a print size was selected. When it is decided that a print size was selected, that is, YES in Step S109, the print size rewriting section 126*a* rewrites the print size stored in the print size storage section 124*a* into the selected print size, in Step S110.

Afterward, in Step S111, the plurality of image data files read out from the medium are stored in the image data storage section 122. At this time, each image data file is stored in a data folder having its folder name corresponding to the docket number assigned by the number assigning section 121.

Subsequently, in Step S112, the display control section 123 controls the display 140 to display thereon an order screen 40 as shown in FIG. 11. In the order screen 40, as shown in FIG. 11, there are displayed eight frames of thumbnail images and the number of prints for each thumbnail image. In addition, for each thumbnail image, an increment button 41 for increasing the number of prints and a decrement button 42 for decreasing the number of prints are displayed. Further, in an upper right portion of the order screen 40, there are displayed increment buttons 43*a*, 43*b*, 43*c*, and 43*d* for increasing the respective correction values for colors of R, G, and B and the density and decrement buttons 44*a*, 44*b*, 44*c*, and 44*d* for decreasing the respective correction values. When inputting a correction value, the operator touches a portion of the touch panel 141 where a thumbnail image for which the correction value is to be input is displayed. The touched image is then put in a selected state as the upper left thumbnail image in the order screen 40 of FIG. 11. In this state, the correction value can be input by operating one of the increment buttons 43*a* to 43*d* or one of the decrement buttons 44*a* to 44*d*. In a lower right portion of the order screen 40, there is displayed a NEXT button 45 for changing the order screen 40 into another order screen 40 containing thumbnail images that have not yet been displayed on the display 140.

When the number of frames of thumbnail images that have not yet been displayed on the display 140 is eight or less in the plurality of thumbnail images corresponding to the plurality of image data files stored in the image data storage section 122, the final page of order screen 40 as shown in FIG. 12 is displayed. Like the order screen 40 shown in FIG. 11 that is not the final page, in the final page of order screen 40, there are displayed eight or less frames of thumbnail images; the number of prints for each thumbnail image; a increment button 41 and a decrement button 42 for increasing/decreasing the number of prints for each thumbnail image; and increments buttons 43*a* to 43*d* and decrement buttons 44*a* to 44*d* for increasing/decreasing correction values. Further, as shown in FIG. 12, an OK button 46 is displayed in a lower right portion of the final page of order screen 40.

Referring back to the flowchart of FIG. 6B, it is then judged in Step S113 whether or not an increment button 41 or a decrement button 42 was operated to input the number of prints. If it is decided that the number of prints for any thumbnail image was not input, that is, NO in Step S113, the flow skips Step S114 as will be described later, and advances to Step S115. On the other hand, when it is decided that the number of prints for a thumbnail image was input, that is, YES in Step S113, the print number rewriting section 126*b* changes the number of prints stored in the print number storage section 124*b* into the input value, in Step S114.

Further, it is judged in Step S115 whether or not one of the increment buttons 43*a* to 43*d* and the decrement buttons 44*a* to 44*d* was operated to input a correction value. If it is decided that any correction value was not input, that is, NO in Step S115, the flow skips Step S116 as will be described later, and advances to Step S117. On the other hand, when it is decided that a correction value was input, that is, YES in Step S115, the correction value rewriting section 126*c* changes the corresponding correction value stored in the correction value storage section 124*c* into the input value, in Step S116.

Afterward, it is judged in Step S117 whether or not the NEXT button 45 or the OK button 46 was pressed. If it is decided that the NEXT button 45 or the OK button 46 was not pressed, that is, NO in Step S117, the flow returns to Step S113, in which it is again judged whether or not the number of prints was input. On the other hand, when it is decided that the NEXT button 45 or the OK button 46 was pressed, that is, YES in Step S117, it is then judged in Step S118 whether or not the print information corresponding to the thumbnail images being displayed in the order screen 40 has already been transmitted to the photo processing apparatus 201.

When it is decided that the print information has not yet been transmitted, that is, NO in Step S118, the print information transmitting section 127 immediately transmits to the photo processing apparatus 201 the print order information corresponding to eight frames of thumbnail images contained in the order screen 40 displayed at the time when the NEXT button 45 or the OK button 46 was pressed, in Step S119. Afterward, the flow advances to Step S130 as will be described later.

On the other hand, when it is decided that the print information has already been transmitted, that is, YES in Step S118, it is then judged in Step S120 whether or not the order information stored in the order information storage section 124 has been changed from the order information previously transmitted. If it is decided that the order information has not been changed from the previously transmitted order information, that is, NO in Step S120, the flow advances to Step S130 as will be described later. On the other hand, when it is decided that the order information has been changed from the previously transmitted order information, that is, YES in Step S120, the information judging section 130 then judges in Step S121 on the basis of the status information transmitted from the photo processing apparatus 201, whether or not print processing for the image data files corresponding to the thumbnail images being displayed in the order screen 40 has been started.

When it is decided that print processing has not yet been started, that is, NO in Step S121, the change permitting section 128 permits a change signal for the print information to be transmitted to the photo processing apparatus 201, and the change signal is transmitted, in Step S122. The flow then advances to Step S130. On the other hand, when it is decided that print processing has been started, that is, YES in Step S121, the display control section 123 controls, on the basis of an instruction of the information judging section 130, display 140 to display thereon a massage 47 to inform the customer that print processing has started, an OK button 48, and a CANCEL button 49, as shown in FIG. 13, in Step S123.

Afterward, it is judged in Step S124 whether or not the CANCEL button 49 was operated. If it is decided that the CANCEL button 49 was operated, that is, YES in Step S124, the flow advances to Step S130 as will be described later. On the other hand, when it is decided that the CANCEL button 49 was not operated, that is, NO in Step S124, it is then judged in Step S125 whether or not the OK button 48 was operated. If it is decided that the OK button 48 was not operated, that is, NO in Step S125, the flow returns to Step S124, in which it is again judged whether or not the CANCEL button 49 was operated. On the other hand, when it is decided that the OK button 48 was operated, that is, YES in Step S125, it is then judged in Step S126, on the basis of the status information transmitted from the photo processing apparatus 201, whether or not print processing for the image data files corresponding to the thumbnail images being displayed on the order screen 40 has ended.

If it is decided that print processing has ended, that is, YES in Step S126, the flow skips Steps S127 and S128 as will be described later, and advances to Step S129. On the other hand, when it is decided that print processing has not yet ended, that is, NO in Step S126, it is then judged in Step S127 whether or not the order information was changed in Step S113 or S115 to decrease the number of prints, eliminate a print image, or change a correction value. If it is decided that the order information was not changed to decrease the number of prints, eliminate a print image, or change a correction value, that is, NO in Step S127, the flow skips Step S128 and advances to Step S129. On the other hand, when it is decided that the order information was changed to decrease the number of prints, eliminate a print image, or change a correction value, that is, YES in Step S127, the interruption information transmitting section 131 transmits to the photo processing apparatus 201 interruption information to urge the operator of the photo processing apparatus 201 that print processing for the data files corresponding to the order information be interrupted, in Step S128.

Subsequently, it is judged in Step S129 whether or not the order information was changed in Step S113 or S115 to increase the number of prints, add an image data file to be printed, or change a correction value. If it is decided that the order information was not changed to increase the number of prints, add an image data file to be printed, or change a correction value, that is, NO in Step S129, the flow advances to Step S130 as will be described later. On the other hand, when it is decided that the order information was changed to increase the number of prints, add an image data file to be printed, or change a correction value, that is, YES in Step S129, the flow advances to Step S119 as described above, in which print information corresponding to the changed order information is transmitted to the photo processing apparatus 201.

Afterward, it is judged in Step S130 whether or not the order screen 40 being displayed on the display 140 is the final page. When it is decided that the order screen 40 is not the final page, that is, NO in Step S130, the order screen 40 is changed into another order screen 40 containing thumbnail images that have not yet been displayed on the display 140, in the plurality of thumbnail images corresponding to the plurality of image data files stored in the image data storage section 122, in Step S131. The flow then returns to Step S113 as described above, in which it is again judged whether or not the number of prints was input.

On the other hand, when it is decided that the order screen 40 is the final page, that is, YES in Step S130, the display control section 123 controls the display 140 to display thereon a name input screen 50 as shown in FIG. 14, in Step S132. In the name input screen 50, as shown in FIG. 14, there are displayed input keys 51 for inputting a name, and a display area 52 for displaying therein the name input with the input keys 51. An OK button 53 is displayed in a lower right portion of the name input screen 50.

It is judged in Step S133 whether or not the customer input a name with the input keys 51 and pressed the OK button 53. If it is decided that the OK button 53 was not pressed, that is, NO in Step S133, the judgment of Step S133 is repeated until it is decided that the OK button 53 was pressed. On the other hand, when it is decided that the OK button 53 was pressed, that is, YES in Step S133, the name input through the name input screen 50 is stored in the customer information storage section 125, in Step S134.

Subsequently, in Step S135, the display control section 123 controls the display 140 to display thereon an order contents check screen 60 as shown in FIG. 15. In the order contents check screen 60, as shown in FIG. 15, there are displayed the name of the customer; the order number and branch numbers in relation to the image data files for which the customer has ordered to be printed; print sizes; the numbers of prints; the charges; and so on. An OK button 61 is displayed in a lower right portion of the order contents check screen 60.

It is judged in Step S136 whether or not the customer who had checked the contents being displayed in the order contents check screen 60 pressed the OK button 61. If it is decided that the OK button 61 was not pressed, that is, NO in Step S136, the judgment of Step S136 is repeated until it is decided that the OK button 61 was pressed. On the other hand, when it is decided that the OK button 61 was pressed, that is, YES in Step S136, the display control section 123 controls the display 140 to display thereon a receipt issuance screen 70 as shown in FIG. 16, in Step S137. In the receipt issuance screen 70, as shown in FIG. 16, there are displayed a message to urge the customer to take the medium out of the media drive 150; and a message to inform the customer that a receipt is being issued. Subsequently, in Step S138, the receipt issuing section 132 controls the receipt printer 160 to issue a receipt as shown in FIG. 17.

Next, a procedure of interrupt processing to be started in Step S104 of the flowchart of FIG. 6A will be described with reference to FIG. 7. Interrupt processing as is described here is processing in relation to an operation of a RETURN button 91 being displayed in a lower right portion of the medium set guidance screen 20, the print size selection screen 30, the order screen 40, the name input screen 50, and the order contents check screen 50 as shown in FIGS. 9 to 12, 14, and 15; and an operation of a CANCEL button 92 being displayed in a lower left portion of the screens. Interrupt processing is performed in parallel with processing of Steps S105 to S136 of the flowchart of FIGS. 6A to 6C.

First, it is judged in Step S201 whether or not the RETURN button 91 was operated. When it is decided that the RETURN button 91 was operated, that is, YES in Step S201, the display control section 123 controls the display 140 to change the screen being displayed on the display 140 into the screen previously displayed, in Step S202. For example, when the RETURN button 91 of the first page of order screen 40 was operated, the screen is changed into the print size selection screen 30. When the RETURN button 91 of an order screen 40 that is not the first page was operated, the screen is changed into the previously displayed page of order screen 40.

It is then judged in Step S203 whether or not the screen being displayed after the change in Step S202 is the initial screen 10. When it is decided that the initial screen 10 is being displayed, that is, YES in Step S203, the flow of interrupt processing ends. On the other hand, when it is decided that the initial screen 10 is not being displayed, that is, NO in Step S203, the flow returns to Step S201 as described above, in which it is again judged whether or not the RETURN button 91 was operated.

When it is decided in Step S201 that the RETURN button 91 was not operated, that is, NO in Step S201, it is then judged in Step S204 whether or not the CANCEL button 92 was operated. When it is decided that the CANCEL button 92 was operated, that is, YES in Step S204, the display control section 123 controls the display 140 to change the screen being displayed on the display 140 into the initial screen 10, in Step S205. On the other hand, when it is decided that the CANCEL button 92 was not operated, that is, NO in Step S204, the flow returns to Step S201, in which it is again judged whether or not the RETURN button 91 was operated.

As described above, interrupt processing is continued until the medium set guidance screen 20, the print size selection screen 30, any order screen 40, the name input screen 50, or the order contents check screen 60 is not displayed on the display 140.

Figure 19:
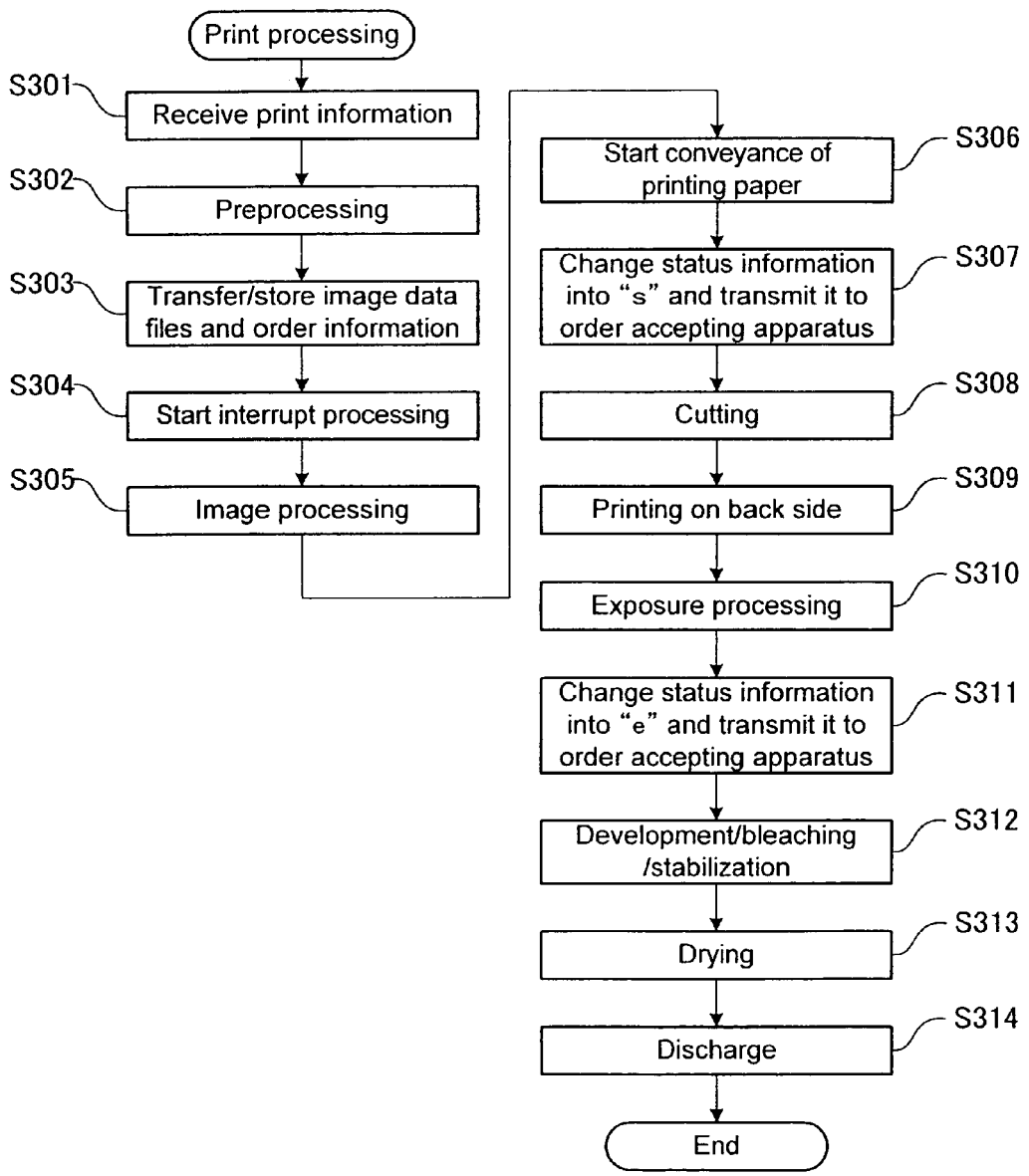
FIG. 19 is a flowchart showing a procedure for the photo processing apparatus shown in FIG. 4 making photo prints.
Figure 20:
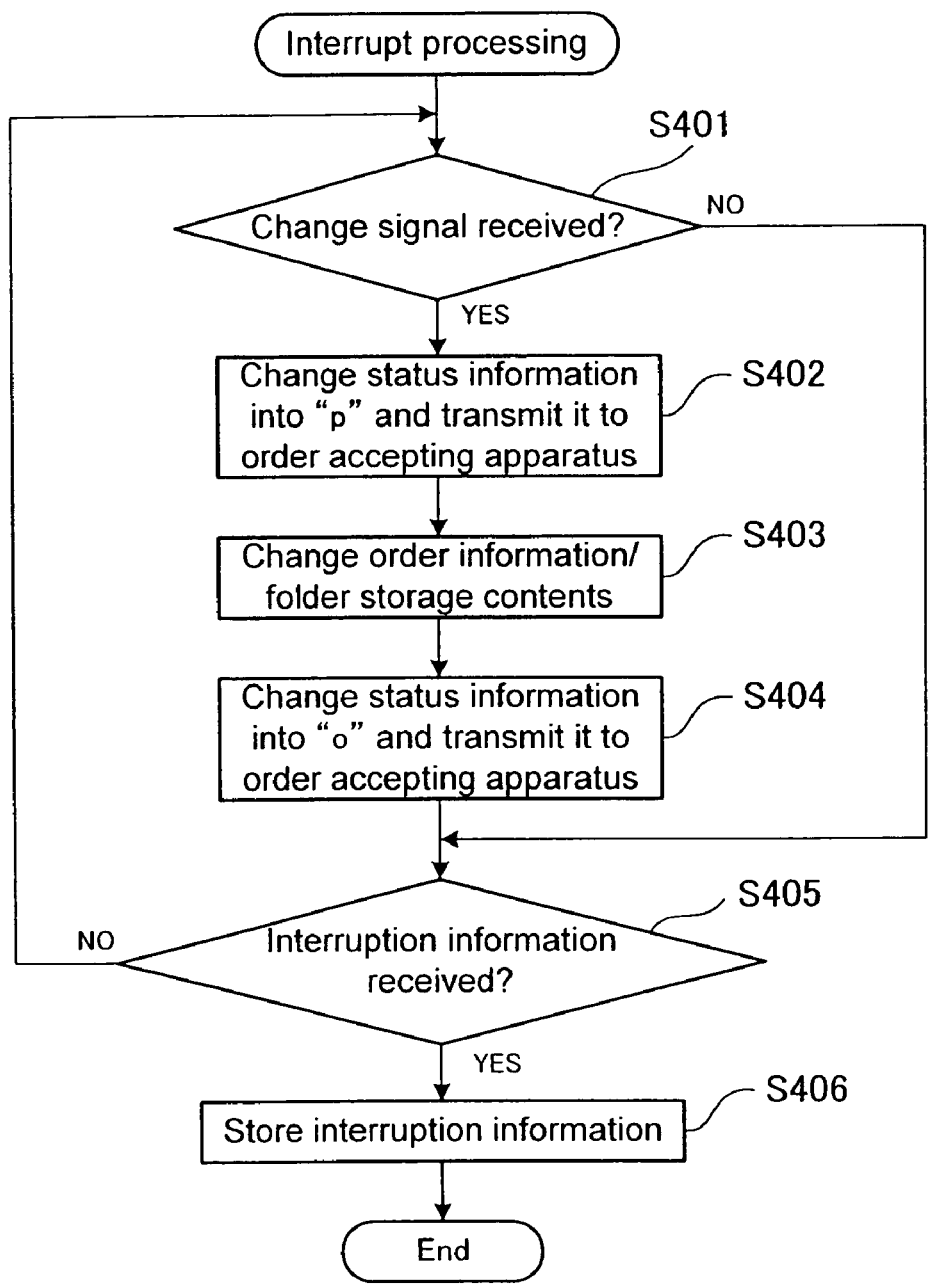
FIG. 20 is a flowchart showing a procedure of interrupt processing to be performed in the flowchart shown in FIG. 19.

Next, a procedure of processing in the photo processing apparatus 201 will be described with reference to FIGS. 19 and 20. FIG. 19 is a flowchart showing a procedure of making photo prints by the photo processing apparatus 201, more specifically, making photo prints according to an image data file group sent in a lump from a print order accepting apparatus 101. FIG. 20 is a flowchart showing a procedure of interrupt processing to be performed in the flowchart shown in FIG. 19.

First, in Step S301, the photo processing apparatus 201 receives print information from a print order accepting apparatus 101. In Step S302, the data preprocessing section 231 separates the print information into an image data file group and order information. In Step S303, the image data file group is transferred to and stored in the image data storage section 232 together with the docket number assigned to the image data file group; and the order information is transferred to and stored in the order information storage section 233 together with the docket number. At this time, the image data file group sent in a lump from the print order accepting apparatus 101 is stored in one data folder.

In Step S304, interrupt processing as will be described later in detail is started. In Step S305, the image processing section 240 applies various kinds of image processing to each image data file being stored in the image data storage section 232.

In Step S306, a plurality of conveyance roller pairs 255 starts conveying a printing paper. In Step S307, the status information changing section 236 changes the status information being stored in the status information storage section 234, on the data folder in which the image data file group was stored in Step S303, from "o" meaning that print processing has not yet been started and can be started, into "s" meaning that print processing has been started and not yet ended. The status information transmitting section 237 then transmits the changed status information to the print order accepting apparatus 101.

In Step S308, the cutter 256 cuts the printing paper into a print size contained in the order information being stored in the order information storage section 233. In Step S309, the printing unit 257 prints on the non-emulsion surface of the printing paper the terminal ID of the print order accepting apparatus 101 that has been accepted the order, the docket number of the corresponding image data file, and the correction values for the colors and density, as shown in FIG. 25. In Step S310, the exposure unit 258 exposes the printing paper to form thereon a latent image of the image corresponding to the image data file to which image processing has been applied. After exposure processing in Step S310 is completed for the images corresponding to all image data files, the flow advances to Step S311, in which the status information changing section 236 changes the status information being stored in the status information storage section 234, on the data folder in which the image data file group was stored in Step S303, from "s" meaning that print processing has been started and not yet ended, into "e" meaning that print processing has ended; and the status information transmitting section 237 transmits the changed status information to the print order accepting apparatus 101.

In step S312, each printing paper on which a latent image has been formed is sent from the printer 251 to the processor 252, where processing of development, bleaching, stabilization, and so on, is applied. In Step S313, each printing paper on which an image has been actualized is sent from the processor 252 to the finish processing unit 253, where dry processing is applied. In Step S314, each printing paper is discharged as a photo print out of the photo processing apparatus 210.

Next, a procedure of interrupt processing to be started in Step S304 of the flowchart of FIG. 19 will be described with reference to FIG. 20. Interrupt processing as is described here is processing to be performed in the photo processing apparatus 201 when the customer changed print information and a change signal for the print information or interruption information for print processing was transmitted from a print order accepting apparatus 101.

First, in Step S401, the status information judging section 235 judges whether or not a change signal for print information was received from a print order accepting apparatus 101. If it is decided that no change signal was received, that is, NO in Step S401, the flow skips Steps S402 to S404 as will be described later, and advances to Step S405. On the other hand, when it is decided that a change signal was received, that is, YES in Step S401, the flow advances to Step S402, in which the status information changing section 236 changes the status information being stored in the status information storage section 234, on the data folder in which the image data file group was stored in Step S303 in FIG. 19, from "o" meaning that print processing has not yet been started and can be started, into "p" meaning that print processing can not be started; and the status information transmitting section 237 transmits the changed status information to the print order accepting apparatus 101.

In Step S403, on the basis of the received change signal for the print information, the print information changing section 238 changes the order information being stored in the order information storage section 233, and/or the storage contents of the data folder provided in the image data storage section 232. In Step S404, the status information changing section 236 changes the status information being stored in the status information storage section 234, on the data folder in which the image data file group was stored in Step S303 in FIG. 19, from "p" meaning that print processing has not yet been started and can not be started, into "o" meaning that print processing can be started. The status information transmitting section 237 then transmits the changed status information to the print order accepting apparatus 101.

In Step S405, it is judged whether or not a text file containing a message to urge that print processing be interrupted, was received from a print order accepting apparatus 101. If it is decided that no text file was received, that is, NO in Step S405, the flow returns to Step S401, in which it is again judged whether or not a change signal was received. On the other hand, when it is decided that a text file was received, that is, YES in Step S405, the flow advances to Step S406, in which the received text file is stored in the interruption information storage section 239. In this case, if the operator of the photo processing apparatus 201 opens the text file being stored in the interruption information storage section 239, a message as shown in FIG. 24 is displayed on the display 211.

As described above, in the printing system 1 of this embodiment, before the customer presses the OK button 61 of the order contents check screen 60 to determine his or her order, the print information transmitting section 127 transmits to the photo processing apparatus 201 print information corresponding to each image for which order information to request one or more prints was input through an order screen 40. Thus, before the order for all the image data files read out from the medium is determined, the photo processing apparatus 201 can start making a photo print for an image corresponding to an image data file for which order information to request one or more prints was input. As a result, the first photo print is finished sooner than that in a case wherein the photo processing apparatus 201 starts making photo prints after the order for all image data files is determined. Therefore, the customer can obtain the first photo print earlier. The customer can appreciate the finished photo print while waiting for the remaining photo prints to be finished. Thus, the printing system 1 of this embodiment can reduce a feeling of waiting a long time, of the customer who is waiting for the finish of the photo prints.

In the printing system 1 of this embodiment, each time when eight frames of thumbnail images are displayed on the display 140, print information corresponding to an image of the eight frames of thumbnail images to which order information to request one or more prints was assigned, is transmitted to the photo processing apparatus 201. Thus, the photo processing apparatus 201 can start making photo prints more rapidly in comparison with a case, for example, wherein the photo processing apparatus 201 starts making photo prints after order information is given to the images corresponding to all the image data files read out from the medium, and before the order for the images is determined. Further, for example, even in the case that images to each of which order information to request one or more prints is to be given, are sparse in anterior images displayed on the display 140 and concentrates in posterior images displayed on the display 140, the photo prints for the anterior images can be made rapidly.

In the printing system 1 of this embodiment, when the NEXT button 45 of an order screen 40 is pressed, the print information transmitting section 127 transmits to the photo processing apparatus 201 print information corresponding to an image to which order information to request one or more prints was assigned, of the eight frames of thumbnail images displayed at the time when the NEXT button 45 is pressed. Thus, after the customer agrees that photo prints corresponding to images being displayed in the order screen 40 are made in accordance with order information that he or she has input through the touch panel 141, the photo prints of the images contained in the order screen 40 can be made.

In the printing system 1 of this embodiment, the number assigning section 121 of each print order accepting apparatus 101 assigns docket numbers to a plurality of image data files read out by a media drive 150. Even in the case that the photo processing apparatus 201 does not continuously perform print processing for a plurality of image data files ordered in a lump by a customer, and performs print processing for another order in the course of print processing for two image data file groups sequentially sent to the photo processing apparatus 201, for example, in the case that the photo processing apparatus 201 performs processing for orders from a plurality of print order accepting apparatuses 101 at once, or in the case that the photo processing apparatus 201 performs processing in parallel with print processing for an image data file sent from the film scanner 220, the photo processing apparatus 201 can judge by the docket numbers which customer each photo print is for. Thus, the management of image data files in the printing system 1 becomes easy.

In the printing system 1 of this embodiment, a docket number is constituted by an order number common to a plurality of image data files ordered in a lump by a customer; and a branch number common to a group of image data files corresponding to eight or less frames of thumbnail images displayed at once in an order screen 40, that is, the image data files transmitted in a lump by the print information transmitting section 127. This makes it easy to determine the range of a plurality of image data files ordered in a lump by a customer and identify the image data file group corresponding to eight or less frames of thumbnail images displayed at once in an order screen 40.

In the printing system 1 of this embodiment, each docket number is used as part of the folder name of a data folder for storing therein an image data file group corresponding to eight or less frames of thumbnail images displayed at once in an order screen 40, that is, transmitted in a lump by the print information transmitting section 127. Thus, from the directory construction, the range of a plurality of image data files ordered in a lump by a customer can be determined, and the image data file group corresponding to eight or less frames of thumbnail images displayed at once in an order screen 40 can be identified.

In the printing system 1 of this embodiment, the photo processing apparatus 201 includes the printing unit 257 for printing a docket number and so on on the back side of each photo print. Thus, from the docket number printed on the back side of each photo print, it can be known which customer the photo print is for. This makes the management of photo prints easy.

In the printing system 1 of this embodiment, each print order accepting apparatus 101 includes the receipt printer 160 for issuing a receipt on which docket numbers and so on are printed. This makes it easy for a customer to grasp the status of his or her order for photo prints.

In the printing system 1 of this embodiment, on the basis of the status information being stored in the status information storage section 234, the status information judging section 235 judges whether or not print processing has been started for image data files contained in a data folder provided in the image data storage section 232 of the photo processing apparatus 201. Thus, after print information corresponding to an image data file to which order information to request one or more prints has been assigned is transmitted from a print order accepting apparatus 101 to the photo processing apparatus 201, and the image data file contained in the print information is stored in the image data storage section 232, and the order information contained in the print information is stored in the order information storage section 233, the customer who is operating the print order accepting apparatus 101 can be informed whether or not the print information can be changed by the status information on the data folder storing therein the image data file contained in the print information.

In the printing system 1 of this embodiment, when the status information judging section 235 decides that print processing has been started for image data files stored in a data folder, the status information changing section 236 changes the status information on the data folder being stored in the status information storage section 234. Thus, the status information being stored in the status information storage section 234 can be changed from the information to indicate that print processing has not yet been started, into the information to indicate that print processing has been started.

In the printing system 1 of this embodiment, when the customer changed print information corresponding to a data folder containing image data files transmitted to the photo processing apparatus 201, the change permitting section 128 of the print order accepting apparatus 101 permits a change signal for the print information to be transmitted to the photo processing apparatus 201 if status information on the data folder transmitted from the photo processing apparatus 201 indicates that print processing has not yet been started. On the basis of the change signal for the print information transmitted from the print order accepting apparatus 101, the print information changing section 238 changes at least one of the order information being stored in the order information storage section 233 and the storage contents of the data folder provided in the image data storage section 232. Thus, when the status information on the data folder containing the transmitted image data file corresponding to the print information that the operator of the print order accepting apparatus 101 wants to change, indicates that print operation has not yet been started, the print information on prints to be made by the photo processing apparatus 201 can be changed.

In the printing system 1 of this embodiment, the status information judging section 235 judges whether or not print processing has been started for image data files contained in a data folder, and whether or not a change signal for print information has been transmitted from a print order accepting apparatus 101. When the status information judging section 235 decides that print processing has been started, the status information changing section 236 changes the status information being stored in the status information storage section 234, so as to indicate that print processing has been started. When the status information judging section 235 decides that a change signal for print information has been transmitted from a print order accepting apparatus 101, the status information changing section 236 changes the status information being stored in the status information storage section 234, so as to indicate that print processing can not be started. This can prevent the start of print processing for the image data file contained in the data folder corresponding to the print information that the operator of the print order accepting apparatus 101 wants to change.

In the printing system 1 of this embodiment, when the customer changed print information on the data folder containing an image data file group transmitted from a print order accepting apparatus 101, so as to increase the number of prints, add an image data file to be printed, or increase/decrease a correction value, the image retransmission permitting section 129 permits transmission of the image data file group for which the print information has been changed, and order information on the image data files, to the photo processing apparatus 201, if the status information on the data folder indicates that print processing has been started. The image data storage section 232 of the photo processing apparatus 201 then stores in a new folder the image data files transmitted from the print order accepting apparatus 101. Thus, when the customer wants to change print information so as to increase the number of prints, add an image data file to be printed, or increase/decrease a correction value, photo prints can be made in accordance with the print information that the customer desires, by making the photo prints on the basis of the image data files stored in the new folder, even if the status information on the data folder containing the transmitted image data files corresponding to the print information, indicates that print processing has been started.

In the printing system 1 of this embodiment, when the customer changed print information on the data folder containing an image data file group transmitted from a print order accepting apparatus 101, the information judging section 130 instructs the display control section 123 to display on the display 140 a message to inform the customer that print processing has been started, if the status information on the data folder indicates so. This can warn the customer that the change in print information desired by him or her may not be reflected on print results because printing processing has been started.

In the printing system 1 of this embodiment, the status information judging section 235 judges whether or not print processing has been started for image data files contained in a data folder, and whether or not print processing started has ended. When the status information judging section 235 decides that print processing has been started or has ended, the status information changing section 236 changes status information being stored in the status information storage section 234. When the customer changed print information on the data folder containing an image data file group transmitted from a print order accepting apparatus 101, so as to decrease the number of prints, eliminate an image data file to be printed, or increase/decrease a correction value, the interruption information transmitting section 131 transmits interruption information to the photo processing apparatus 201 if the status information on the data folder indicates that print processing is in progress. Therefore, when the status information on the data folder containing transmitted image data files corresponding to print information that the customer wants to change, indicates that print processing has been stated and not ended, the operator can stop print processing oh the basis of the information sent from the print order accepting apparatus 101. For example, when the customer wants to decrease the number of prints, print processing in the photo processing apparatus 201 can be stopped. Thus, by preventing useless photo prints from being made, the cost can be reduced.

In the printing system 1 of this embodiment, the folder name of each data folder provided in the image data storage section 232 of the photo processing apparatus 201 is changed in accordance with status information being stored in the status information storage section 234. Thus, the status information on each data folder can be easily checked by the folder name of the data folder.

Next, a printing system according to a second embodiment of the present invention will be described. The printing system of this embodiment differs in construction from the printing system 1 of the first embodiment mainly in the following point. When an operation is made for changing the order screen 40 being displayed on the display 140 into another order screen 40, the print information transmitting section 127 of the print order accepting apparatus 101 of the printing system 1 transmits to the photo processing apparatus 201 print information on the thumbnail images displayed on the order screen 40 at the time of the operation. Contrastingly, a print information transmitting section of the print order accepting apparatus of the printing system of this embodiment transmits to the photo processing apparatus 201 print information on a predetermined number of images when an operation is made for changing an order screen 40 into another order screen 40 first after the number of images for each of which order information to request one or more prints has been input through an order screen 40, reaches the predetermined number. The other construction of the printing system of this embodiment is the same as that of the printing system 1 shown in FIG. 1, and thus the detailed description thereof is omitted. In this embodiment, each component having the same construction as in the first embodiment is denoted by the same reference numeral as in the first embodiment.

The print information transmitting section of the print order accepting apparatus of this embodiment transmits print information on five images to the photo processing apparatus 201 when the NEXT button 45 of an order screen 40 is pressed to change the order screen 40 into another order screen 40 first after the number of images for which order information to request one or more prints has been input through the corresponding order screen 40, reaches five. The number assigning section assigns, to a plurality of image data files read out by a media drive 150, docket numbers each constituted by an order number common to a plurality of image data files ordered in a lump by the customer, and a branch number common to each image data file group corresponding to five images to be transmitted at once by the print information transmitting section.

Thus, the printing system of this embodiment can reduce a feeling of waiting a long time, of the customer who is waiting for the finish of photo prints, like the printing system 1 of the first embodiment.

In the above-described first and second embodiments, the number assigning section 121 of each print order accepting apparatus 101 assigns docket numbers to a plurality of image data files read out by a media drive 150. However, the present invention is not limited to that. In a modification, the number assigning section 121 may assign docket numbers only to image data files according to which photo prints are made by the photo processing apparatus 201, that is, the image data files for each of which the customer has set the number or prints to one or more. In another modification, such a number assigning section 121 may not be provided.

In the above-described first and second embodiments, each docket number is constituted by an order number common to a plurality of image data files ordered in a lump by the customer, and a branch number common to an image data file group to be transmitted at once by the transmitting section. However, the present invention is not limited to that. In a modification, for example, the number assigning section may assign serial docket numbers to a plurality of image data file so that each image data file group to be transmitted at once by the print information transmitting section, is assigned the same serial docket number. That is, a plurality of docket numbers assigned to a plurality of image data files ordered in a lump by the customer may contain no common part. In another modification, the number assigning section may assign serial docket numbers to the image data files ordered in a lump by the customer. That is, a plurality of docket numbers assigned to a plurality of image data files contained in one image data file group may contain no common part. Even in such modifications, the same advantage as in the above-described embodiments can be obtained if the plurality of docket numbers are linked to each other by linking data generated by, for example, the number assigning section of the print order accepting apparatus 101, and the linking data is transmitted from the print order accepting apparatus 101 to the photo processing apparatus 201.

In the above-described first and second embodiments, the number assigning section assigns to order information the same docket number as the docket number assigned to the image data file corresponding to the order information. However, the present invention is not limited to that. In a modification, the number assigning section may assign to the order information a docket number different from the docket number assigned to the image data file.

In the above-described first and second embodiments, each docket number is used as part of the folder name of a data folder to store therein an image data file group transmitted at once by the print information transmitting section. However, the present invention is not limited to that. It suffices if a plurality of image data files can be linked to respective docket numbers assigned by the number assigning section. Therefore, in a modification, for example, data may separately be prepared to indicate the relation between the plurality of image data files and the docket numbers.

In the above-described first and second embodiments, the photo processing apparatus 201 includes the printing unit 257 for printing a docket number and so on on the back side of each photo print. In a modification, however, such a printing unit 257 may not be provided.

In the above-described first and second embodiments, each print order accepting apparatus 101 includes the receipt printer 160 for issuing a receipt on which docket numbers and so on are printed. In a modification, however, such a receipt printer 160 may not be provided.

In the above-described first embodiment, each time when the NEXT button 45 of an order screen 40 is pressed, the print information transmitting section 127 transmits to the photo processing apparatus 201 print information on images to each of which order information to request one or more prints has been given, of eight frames of thumbnail images that were being displayed in the order screen 40 at the time when the NEXT button 45 was pressed. However, the present invention is not limited to that. In a modification, for example, each time when the total number of thumbnail images displayed on the display 140 reaches a predetermined number, for example, five, the print information transmitting section 127 may transmit to the photo processing apparatus 201 print information on images to each of which order information to request one or more prints has been given, of the predetermined number of thumbnail images. In another modification, each time when order screens 40 are changed twice by pressing NEXT buttons 45 twice, the print information transmitting section 127 may transmit to the photo processing apparatus 201 print information on images to each of which order information to request one or more prints has been given, of eight frames of thumbnail images that were being displayed in the second order screen 40 at the time when the NEXT button 45 of the order screen 40 was pressed, and eight frames of thumbnail images that were being displayed in the first order screen 40 displayed immediately before the second order screen 40.

In the above-described second embodiment, when an operation is made for changing an order screen 40 into another order screen 40 first after the number of images for each of which order information to request one or more prints was input through the corresponding order screen 40 reaches five, the print information transmitting section transmits print information on the five images to the photo processing apparatus 201. However, the present invention is not limited to that. In a modification, for example, immediately after the number of images for each of which order information to request one or more prints was input through the corresponding order screen 40 reaches five, the print information transmitting section may transmit print information on the five images to the photo processing apparatus 201.

In the above-described first and second embodiments, when the customer changed print information corresponding to a data folder containing image data files transmitted to the photo processing apparatus 201, the change permitting section 128 permits a change signal for the print information to be transmitted to the photo processing apparatus 201 if status information on the data folder transmitted from the photo processing apparatus 201 indicates that print processing has not yet been started. On the basis of the change signal for the print information transmitted from the print order accepting apparatus 101, the print information changing section 238 changes at least one of the order information being stored in the order information storage section 233 and the storage contents of the data folder provided in the image data storage section 232. However, the present invention is not limited to that. In a modification, such change permitting section 128 and print information changing section 238 may not be provided.

In the above-described first and second embodiments, the status information judging section 235 judges whether or not print processing has been started for image data files contained in a data folder, whether or not print processing started has ended, and whether or not a change signal for print information has been transmitted from a print order accepting apparatus 101. When the status information judging section 235 decides that print processing has been started, the status information changing section 236 changes the status information being stored in the status information storage section 234, so as to indicate that print processing has been started. When the status information judging section 235 decides that print processing has ended, the status information changing section 236 changes the status information being stored in the status information storage section 234, so as to indicate that print processing has ended. When the status information judging section 235 decides that a change signal for print information has been transmitted from a print order accepting apparatus 101, the status information changing section 236 changes the status information being stored in the status information storage section 234, so as to indicate that print processing can not be started. However, the present invention is not limited to that. In a modification, the status information judging section 235 may only judge whether or not print processing has been started, and the status information changing section 236 may change the status information being stored in the status information storage section 234, only when the status information judging section 235 decides that print processing has been started. In another modification, such a status information changing section 236 may not be provided.

In the above-described first and second embodiments, when the customer changed print information on the data folder containing an image data file group transmitted from a print order accepting apparatus 101, so as to increase the number of prints, add an image data file to be printed, or increase/decrease a correction value, the image retransmission permitting section 129 permits transmission of the image data file group for which the print information has been changed, and order information on the image data files, to the photo processing apparatus 201, if the status information on the data folder indicates that print processing has been started. In a modification, however, such an image retransmission permitting section 129 may not be provided.

In the above-described first and second embodiments, when the customer changed print information on the data folder containing an image data file group transmitted from a print order accepting apparatus 101, the information judging section 130 instructs the display control section 123 to display on the display 140 a message to inform the customer that print processing has been started, if the status information on the data folder indicates so. However, the present invention is not limited to that. In a modification, for example, the customer may be informed by voice that print processing has been started. In another modification, such an information judging section 130 may not be provided.

In the above-described first and second embodiments, when the customer changed print information on a data folder containing an image data file group transmitted from a print order accepting apparatus 101, so as to decrease the number of prints, eliminate an image data file to be printed, or increase/decrease a correction value, the interruption information transmitting section 131 transmits interruption information to the photo processing apparatus 201 if the status information on the data folder indicates that print processing is in progress. In a modification, however, such an interruption information transmitting section 131 may not be provided.

In the above-described first and second embodiments, the folder name of each data folder provided in the image data storage section 232 of the photo processing apparatus 201 is changed in accordance with status information being stored in the status information storage section 234. However, the present invention is not limited to that. In a modification, for example, such a status information storage section 234 may not be provided, and merely the folder name of each data folder provided in the image data storage section may reflect status information. In the modification, the image data storage section 232 stores therein the status information.

In the above-described first and second embodiments, the print information transmitting section 127 transmits to the photo processing apparatus 201 print information on thumbnail images to each of which order information to request one or more prints has been given. However, the present invention is not limited to that. In a modification, the print information transmitting section 127 may transmit to the photo processing apparatus 201 the image data files corresponding to thumbnail images to each of which order information to request no print has been given, in addition to the image data files corresponding to the thumbnail images to each of which order information to request one or more prints has been given. In the modification, the data folders provided in the image data storage section 232 stores therein the image data files corresponding to the thumbnail images to each of which order information to request no print has been given, in addition to the image data files corresponding to the thumbnail images to each of which order information to request one or more prints has been given.

In the above-described first and second embodiments, an image data file group to be transmitted at once by the print information transmitting section, is stored in one data folder. However, the present invention is not limited to that. In a modification, for example, one image data file may be stored in one data folder.

In the above-described first and second embodiments, the touch panel 141 is provided in the front face of the display 140, and a customer touches the touch panel 141 to input order information or change the order screen 40 being displayed on the display screen 140 into another order screen 40. However, the operation for inputting order information into the print order accepting apparatus 101 or changing the order screen 40 is not limited to that. In a modification, for example, the customer can use the keyboard or mouse to input order information into the print order accepting apparatus 101 or change the order screen 40.

In the above-described first and second embodiments, an image is formed through processing of exposure, development, bleaching, stabilization, drying, and so on, in the printer processor 250 of the photo processing apparatus 201 to make a photo print. However, the image formation method is not limited to that. In a modification, for example, an image may be formed with an inkjet printer.

In the above-described first and second embodiments, each print order accepting apparatus 101 is connected to the photo processing apparatus 201 through the data transmission network 301 and cooperates with the photo processing apparatus 201 to constitute the printing system 1. In a modification, however, each print order accepting apparatus 101 may have therein a printer to work independently.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A printing system that accepts an order for photo prints and makes the photo prints, the system comprising:
   a reading unit that reads out a plurality of image data files recorded on a recording medium;
   a display that displays thereon an order screen containing at least one of a plurality of images corresponding to the plurality of image data files read out by the reading unit;
   an inputting unit to be used for inputting order information containing the number of prints for an image being displayed on the display;
   a printing unit that prints on a paper an image to which the order information is given; and
   a print making control unit that controls the printing unit such that a photo print on the paper is made for at least one of the images displayed on the display, and to which the order information to request prints has been given, before the order information to request all of the prints has been completed;
   wherein the print making control unit controls such that photo prints are made each time when a new order screen is displayed first after the total number of images for each of which order information to request prints has been input with the inputting unit, reaches the first predetermined number;
   an image data storage section that stores image data files corresponding to at least one of the images to each of which order information has been given, in at least one of data folders;
   an order information storage section that stores therein order information;
   a storage control section that controls the image data storage section to store therein the image data file corresponding to the at least one of the images to each of which order information has been given, and controls the order information storage section to store therein order information corresponding to the at least one of the image data files stored in the image data storage section, before an order is determined for the at least one of the images to each of which order information has been given;
   a status information storage section that stores therein status information as to whether or not print processing has been started for image data files corresponding to images to each of which order information to request one or more prints has been given, of the image data files stored in each data folder provided in the image data storage section; and
   a judging section that judges, on the basis of status information being stored in the status information storage section, whether or not at least one of order information being stored in the order information storage section, and storage contents of the data folder, can be changed.

2. A printing system that accepts an order for photo prints and makes the photo prints, the system comprising:
   a reading unit that reads out a plurality of image data files recorded on a recording medium;
   a display that displays thereon an order screen containing at least one of a plurality of images corresponding to the plurality of image data files read out by the reading unit;
   an inputting unit to be used for inputting order information containing the number of prints for an image being displayed on the display;
   a printing unit that prints on a paper an image to which the order information is given; and
   a print making control unit that controls the printing unit such that a photo print on the paper is made for at least one of the images displayed on the display, and to which the order information to request prints has been given, before the order information to request all of the prints has been completed;
   wherein the print making control unit controls such that photo prints are made each time when a new order screen is displayed first after the total number of images displayed on the display reaches a positive integer multiple of a second predetermined number;
   an image data storage section that stores image data files corresponding to at least one of the images to each of which order information has been given, in at least one of data folders;
   an order information storage section that stores therein order information;
   a storage control section that controls the image data storage section to store therein the image data file corresponding to the at least one of the images to each of which order information has been given, and controls the order information storage section to store therein order information corresponding to the at least one of the image data files stored in the image data storage section, before an order is determined for the at least one of the images to each of which order information has been given;
   a status information storage section that stores therein status information as to whether or not print processing has been started for image data files corresponding to images to each of which order information to request one or more prints has been given, of the image data files stored in each data folder provided in the image data storage section; and
   a judging section that judges, on the basis of status information being stored in the status information storage section, whether or not at least one of order information being stored in the order information storage section, and storage contents of the data folder, can be changed.

3. The system according to claim 1, wherein the second predetermined number is the maximum number of images that can be displayed in one order screen.

4. A printing system that accepts an order for photo prints and makes the photo prints, the system comprising:
- a reading unit that reads out a plurality of image data files recorded on a recording medium;
- a display that displays thereon an order screen containing at least one of a plurality of images corresponding to the plurality of image data files read out by the reading unit;
- an inputting unit to be used for inputting order information containing the number of prints for an image being displayed on the display;
- a printing unit that prints on a paper an image to which the order information is given; and
- a print making control unit that controls the printing unit such that a photo print on the paper is made for at least one of the images displayed on the display, and to which the order information to request prints has been given, before the order information to request all of the prints has been completed;
- wherein the print making control unit controls such that photo prints are made each time when an operation for changing the order screen being displayed on the display is performed n times, where n is a positive integer;
- an image data storage section that stores image data files corresponding to at least one of the images to each of which order information has been given, in at least one of data folders;
- an order information storage section that stores therein order information;
- a storage control section that controls the image data storage section to store therein the image data file corresponding to the at least one of the images to each of which order information has been given, and controls the order information storage section to store therein order information corresponding to the at least one of the image data files stored in the image data storage section, before an order is determined for the at least one of the images to each of which order information has been given;
- a status information storage section that stores therein status information as to whether or not print processing has been started for image data files corresponding to images to each of which order information to request one or more prints has been given, of the image data files stored in each data folder provided in the image data storage section; and
- a judging section that judges, on the basis of status information being stored in the status information storage section, whether or not at least one of order information being stored in the order information storage section, and storage contents of the data folder, can be changed.

5. The system according to claim 1, further comprising a number assigning unit that assigns a docket number to each image data file corresponding to an image to which order information to request prints has been given with the inputting unit.

6. The system according to claim 5, wherein each docket number contains a number common to image data files in groups corresponding to photo prints to be made in a set, and a number common to the image data files in a group corresponding to photo prints to be made in a set.

7. The system according to claim 5, wherein each docket number at least part of a folder name of a data folder to store therein image data files corresponding to photo prints to be made in a set.

8. The system according to claim 5, further comprising a printing unit that prints a docket number on a back side of each photo print.

9. The system according to claim 5, further comprising a receipt printer that issues a receipt on which a docket number has been printed.

10. A printing system that accepts an order for photo prints and makes the photo prints, the system comprising:
- a reading unit that reads out a plurality of image data files recorded on a recording medium;
- a display that displays thereon an order screen containing at least one of a plurality of images corresponding to the plurality of image data files read out by the reading unit;
- an inputting unit to be used for inputting order information containing the number of prints for an image being displayed on the display;
- a printing unit that prints on a paper an image to which the order information is given;
- a print making control unit that controls the printing unit such that a photo print on the paper is made for at least one of the images displayed on the display, and to which the order information to request prints has been given, before the order information to request all of the prints has been completed; and
- an image data storage section that stores image data files corresponding to at least one of the images to each of which order information has been given, in at least one of data folders;
- an order information storage section that stores therein order information;
- a storage control section that controls the image data storage section to store therein the image data file corresponding to the at least one of the images to each of which order information has been given, and controls the order information storage section to store therein order information corresponding to the at least one of the image data files stored in the image data storage section, before an order is determined for the at least one of the images to each of which order information has been given;
- a status information storage section that stores therein status information as to whether or not print processing has been started for image data files corresponding to images to each of which order information to request one or more prints has been given, of the image data files stored in each data folder provided in the image data storage section; and
- a judging section that judges, on the basis of status information being stored in the status information storage section, whether or not at least one of order information being stored in the order information storage section, and storage contents of the data folder, can be changed.

11. The system according to claim 10, further comprising a status information changing section that changes status information being stored in the status information storage section, when print processing has been started for image data files contained in the data folder, corresponding to images to each of which order information to request prints has been given.

12. The system according to claim 10, further comprising a print information changing section that changes at least one of order information being stored in the order information storage section, and storage contents of the data folder, if the status information on the data folder indicates that print processing has not yet been started, when print information containing at least one of the image data files corresponding to the data folder and order information given to the image data files, was changed by operating the inputting unit.

13. The system according to claim 11, wherein the status information storage section stores therein status information on each data folder provided in the image data storage section, as to whether or not print processing has been started for image data files contained in the data folder, corresponding to images to each of which order information to request prints has been given, and as to whether or not print processing can be started if print processing has not yet been started;

the judging section judges for each data folder provided in the image data storage section whether or not print processing has been started for image data files contained in the data folder, corresponding to images to each of which order information to request prints has been given, and if print processing has not yet been started, as to whether or not print information containing at least one of the image data files corresponding to the data folder and order information given to the image data files, has been updated by operating the inputting unit; and the status information changing section changes the status information being stored in the status information storage section, so as to indicate that print processing has been started, if the judging section decides that print processing has been started, and the status information changing section changes the status information being stored in the status information storage section, so as to indicate that print processing can not be started, if the judging section decides that print processing has not yet been started and the print information has been updated by operating the inputting unit.

14. The system according to claim 10, wherein the image data storage section stores an image data file corresponding to print information containing at least one of the image data files corresponding to a data folder and order information given to the image data files, in a new folder, if the print information has been changed by operating the inputting unit so as to increase the number of prints, add an image data file to be printed, or correct an image to be printed, and status information on the old data folder indicates that print processing has been started.

15. The system according to claim 10, further comprising an informing section that informs an operator of the inputting unit that print processing has been started, if print information containing at least one of the image data files corresponding to a data folder and order information given to the image data files, has been changed by operating the inputting unit, and the status information on the data folder indicates that print processing has been started.

16. The system according to claim 11, wherein the status information storage section stores therein status information on each data folder provided in the image data storage section, as to whether or not print processing has been started for image data files contained in the data folder, corresponding to images to each of which order information to request prints has been given, and as to whether or not print processing started has ended;

the judging section judges for each data folder provided in the image data storage section whether or not print processing has been started for image data files contained in the data folder, corresponding to images to each of which order information to request prints has been given, and whether or not print processing started has ended; and the status information changing section changes the status information being stored in the status information storage section, if the judging section decides that print processing has been started or has ended.

17. The system according to claim 10, wherein a folder name of each data folder provided in the image data storage section is changed in accordance with status information being stored in the status information storage section.

18. The system according to claim 10, wherein the status information storage section serves also as a storage section for a folder name of each data folder provided in the image data storage section.

* * * * *